(12) United States Patent
Nagaya

(10) Patent No.: US 9,365,082 B2
(45) Date of Patent: Jun. 14, 2016

(54) ATTACHMENT STRUCTURE

(75) Inventor: Gou Nagaya, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 218 days.

(21) Appl. No.: 14/124,174

(22) PCT Filed: May 24, 2012

(86) PCT No.: PCT/JP2012/063300
§ 371 (c)(1),
(2), (4) Date: Dec. 5, 2013

(87) PCT Pub. No.: WO2012/169364
PCT Pub. Date: Dec. 13, 2012

(65) Prior Publication Data
US 2014/0103186 A1    Apr. 17, 2014

(30) Foreign Application Priority Data

Jun. 6, 2011 (JP) ................................. 2011-126441
Jun. 6, 2011 (JP) ................................. 2011-126554

(51) Int. Cl.
*B60C 23/04* (2006.01)
*F16M 13/02* (2006.01)
*B29D 30/00* (2006.01)

(52) U.S. Cl.
CPC ............ *B60C 23/0493* (2013.01); *F16M 13/02* (2013.01); *B29D 2030/0072* (2013.01); *B60C 2019/004* (2013.04)

(58) Field of Classification Search
CPC .................................................. B60C 23/0493
See application file for complete search history.

(56) References Cited

U.S. PATENT DOCUMENTS

| 8,051,705 | B2 | 11/2011 | Kobayakawa |
| 2002/0046791 | A1 | 4/2002 | Rensel et al. |
| 2010/0276563 | A1 | 11/2010 | Cubizolle et al. |

FOREIGN PATENT DOCUMENTS

| CN | 1982098 A | 6/2007 |
| JP | 2006-234579 A | 9/2006 |
| JP | 2007-55347 A | 3/2007 |
| JP | 2009-298327 A | 12/2009 |
| JP | 2011500443 A | 1/2011 |
| WO | 2008/059838 A1 | 5/2008 |

OTHER PUBLICATIONS

Extended European Search Report, dated Aug. 7, 2014, issued in counterpart European Patent Application No. 12796559.8.
International Search Report of PCT/JP2012/063300 dated Aug. 28, 2012.
Written Opinion of PCT/JP2012/063300 dated Aug. 28, 2012.
Communication dated Jul. 31, 2015, issued by the State Intellectual Property Office of the People's Republic of China in counterpart Chinese Application No. 201280037883.2.
Communication dated Oct. 13, 2015, issued by the Japan Patent Office in corresponding Japanese Application No. 2014-227812.

*Primary Examiner* — Paul West
(74) *Attorney, Agent, or Firm* — Sughrue Mion, PLLC

(57) ABSTRACT

This attachment structure (200) is provided with a pedestal (210) having: a pedestal bottom surface (211) adhered to the inner surface of a tire (100); and a pedestal upper surface (212) provided to the reverse side from the pedestal bottom surface (211). In the peripheral direction of the tire, the adhesion length of the pedestal bottom surface (211) adhered to the inner surface of the tire (100) is no greater than 45 mm.

10 Claims, 25 Drawing Sheets

|  |  | EXAMPLE 1 | EXAMPLE 2 | EXAMPLE 3 |
|---|---|---|---|---|
| COEFFICIENT B |  | 0.1758 | 0.1758 | 0.1758 |
| TMAX/(A*C) |  | 11592 | 11592 | 11592 |
| MASS M OF FUNCTION COMPONENT | G | 18 | 14 | 18 |
| HEIGHT $H_{240}$ OF CENTER OF GRAVITY OF FUNCTION COMPONENT | MM | 10 | 10 | 10 |
| PEDESTAL THICKNESS $T_{210}$ | MM | 3.5 | 3.5 | 3.5 |
| TARGET DURABILITY SPEED V | KM/H | 200 | 200 | 180 |
| TIRE DIAMETER R | M | 0.6 | 0.6 | 0.6 |
| ADHESIVE LENGTH $L_{210}$ | MM | 43.0 | 41.6 | 41.8 |
| END STRESS | $N/M^2$ | 26059 | 26059 | 26059 |

FIG. 19

|  |  | EXAMPLE 1 | EXAMPLE 2 | EXAMPLE 3 |
|---|---|---|---|---|
| COEFFICIENT B |  | 0.1758 | 0.1758 | 0.1758 |
| TMAX/(A*C) |  | 11592 | 11592 | 11592 |
| MASS M OF FUNCTION COMPONENT | G | 18 | 14 | 18 |
| HEIGHT $H_{240}$ OF CENTER OF GRAVITY OF FUNCTION COMPONENT | MM | 10 | 10 | 10 |
| PEDESTAL THICKNESS $T_{210}$ | MM | 3.5 | 8.8 | 7.9 |
| TARGET DURABILITY SPEED V | KM/H | 200 | 200 | 180 |
| TIRE DIAMETER R | M | 0.6 | 0.6 | 0.6 |
| ADHESIVE LENGTH $L_{210}$ | MM | 43 | 43 | 43 |

FIG. 20

| PEDESTAL THICKNESS $T_{210}$ | 1 | 3 | 6 |
|---|---|---|---|
| DURABILITY LIMIT (KM/H) | 220 | 220 | 180 |
| DAMAGED STATE | INNER LINER AND PLY CORD IMMEDIATELY BELOW PEDESTAL RUBBER ADHESIVE UNIT DAMAGED | PEDESTAL RUBBER_TIRE ADHESIVE SURFACE DETACHMENT | PEDESTAL RUBBER_TIRE ADHESION DETACHMENT |

TIRE CIRCUMFERENTIAL DIRECTION

TIRE CIRCUMFERENTIAL DIRECTION

FIG. 26

| TEST SPEED | EX. 1 | EX. 2 |
|---|---|---|
| 180 KM/H | NO PEDESTAL DAMAGE | NO PEDESTAL DAMAGE |
| 190 KM/H | PEDESTAL_TIRE ADHESION DETACHMENT | NO PEDESTAL DAMAGE |
| 210 KM/H | PEDESTAL_TIRE ADHESION DETACHMENT | NO PEDESTAL DAMAGE |
| 220 KM/H | PEDESTAL_TIRE ADHESION DETACHMENT | PEDESTAL RUBBER_TIRE ADHESION PARTIAL DETACHMENT |

ATTACHMENT STRUCTURE

TECHNICAL FIELD

The present invention relates to an attachment structure that attaches a function component having a function of detecting a state of a tire, to an inner surface of the tire.

BACKGROUND ART

Conventionally, it is known a tire provided with a pair of bead cores, a carcass layer, having a toroidal shape, over an interval between the pair of bead cores, a belt layer placed adjacently to the carcass layer, and a rubber layer that covers the bead cores, the carcass layer, and the belt layer.

The tire includes a bead unit having a bead core, a tread unit having a tire tread surface, a sidewall unit that forms a side wall of the tire, and a shoulder unit that is arranged over an interval between the side wall unit and the tread unit.

Further, a function component attached to a rubber layer (inner liner) configuring an inner surface of the tire is also known. The function component is a sensor module that measures a temperature, a pressure, etc., of the interior of the tire, for example. Generally, the function component is attached to the inner liner by a rubber patch, for example (for example, Patent Literature 1).

CITATION LIST

Patent Literature

[Patent Literature 1] Japanese Unexamined Patent Application Publication No. 2007-055347

SUMMARY OF INVENTION

Between a state where the tire comes into contact with a road surface (grounding state) and a state where the tire does not come into contact with the road surface (non-grounding state), the shape of the inner liner differs. That is, in the grounding state, the inner liner is of flat shape, and in the non-grounding state, the inner liner is of arc shape.

In order to accommodate a deformation of such an inner liner, it is considered using relatively soft rubber as a material configuring rubber patch or the like. However, when a relatively soft rubber is used, the durability is decreased.

Therefore, the present invention has been achieved in order to solve the above-described problem, and an object thereof is to provide an attachment structure that enables restraining of detachment from an inner surface of a tire while restraining a decrease in durability.

Solution to Problem

An attachment structure according to a first feature attaches a function component having a function of detecting a state of a tire to an inner surface of the tire. The attachment structure comprises: a pedestal formed of an elastic member, and including a pedestal lower surface bonded to the inner surface of the tire and a pedestal upper surface arranged opposite to the pedestal lower surface. An adhesive length in a tire circumferential direction where the pedestal lower surface is bonded to the inner surface of the tire is equal to or less than 45 mm, when the pedestal is bonded to the inner surface of the tire.

An attachment structure according to a second feature attaches a function component having a function of detecting a state of a tire to an inner surface of the tire. The attachment structure comprises: a pedestal formed of an elastic member and including a pedestal lower surface bonded to an inner surface of the tire, a pedestal upper surface arranged opposite to the pedestal lower surface, and a pedestal inclined surface that continues from an end of the pedestal lower surface in a tire circumferential direction to an end of the pedestal upper surface in the tire circumferential direction. The pedestal inclined surface has a recessed portion recessed with a curvature of a curvature radius R toward a center of the pedestal in the tire circumferential direction. In a cross section along the tire circumferential direction, a denotes a point farthest from an inner surface of the tire, in the recessed portion; b denotes a point at which to contact with the inner surface of the tire, in the recessed portion; c denotes an intersection point that intersects with a perpendicular line that extends down from the a to the pedestal lower surface, in the pedestal lower surface; ac denotes a line segment that links the a and the c; bc denotes a line segment that links the b and the c; A denotes a shorter length, out of the ac and the bc; and B denotes a longer length, out of the ac and the bc, and when the A and the B satisfy a condition of $1/3^{0.5} \times B < A < B$, the R satisfies a relationship of $(A^2+B^2)/(2 \times A) < R < (A^2+B^2)^{0.5}$.

BRIEF DESCRIPTION OF DRAWINGS

FIG. 19 is a diagram describing the thickness of the pedestal 210.

FIG. 20 is a diagram describing a relationship between the thickness of the pedestal 210 and a durability limit.

FIG. 26 is a diagram describing an evaluation result.

DESCRIPTION OF EMBODIMENTS

Hereinafter, an attachment structure according to an embodiment of the present invention will be described with reference to drawings. In addition, in the description of the drawings below, identical or similar symbols are assigned to identical or similar portions.

It is appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

An attachment structure according to the embodiment attaches a function component having a function of detecting a state of a tire to an inner surface of the tire. The attachment structure comprises: a pedestal formed of an elastic member, and including a pedestal lower surface bonded to the inner surface of the tire and a pedestal upper surface arranged opposite to the pedestal lower surface. An adhesive length in a tire circumferential direction where the pedestal lower surface is bonded to the inner surface of the tire is equal to or less than 45 mm, when the pedestal is bonded to the inner surface of the tire.

In the present embodiment, the adhesive length where the pedestal lower surface is bonded to the inner surface of the tire is 45 mm or less. That is, the adhesive length is an appropriate value, and thus, detachment from the inner surface of the tire can be suppressed. Further, it is not necessary to use soft rubber, and thus, a decrease in durability of the pedestal can be suppressed.

(Configuration of Tire)

Figure 1:
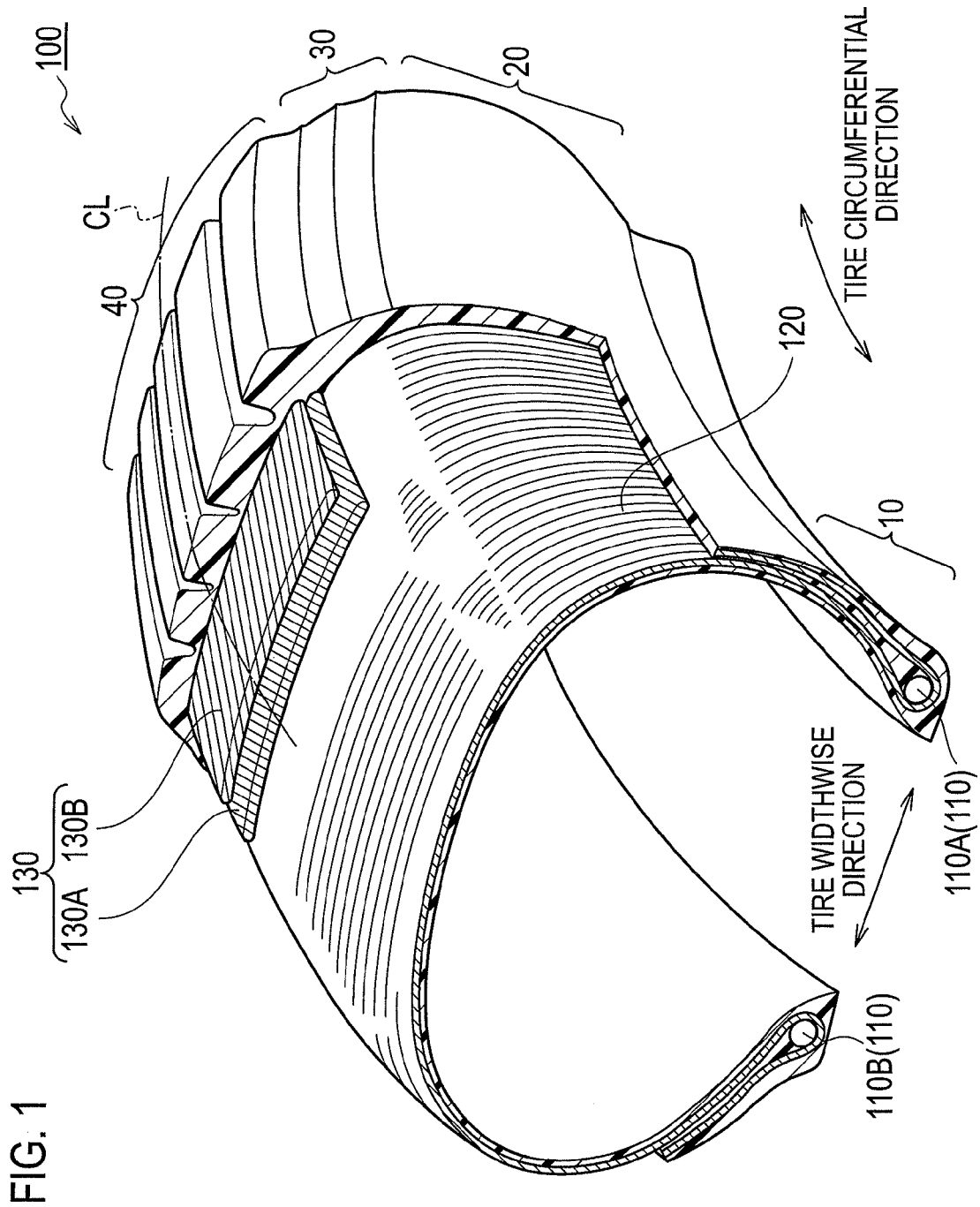
FIG. 1 is a diagram illustrating a tire 100 according to a first embodiment.
Figure 2:
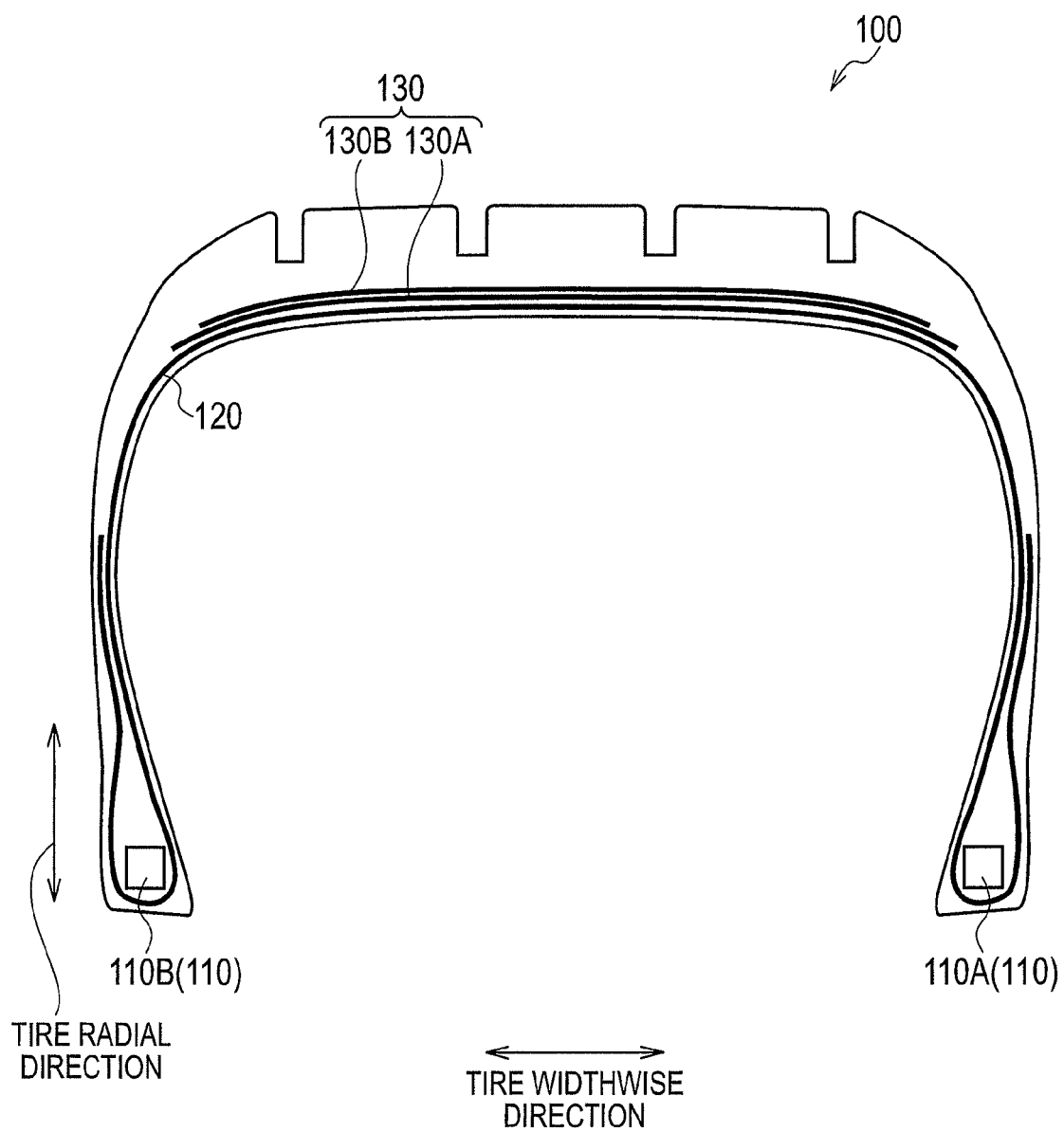
FIG. 2 is a diagram illustrating the tire 100 according to the first embodiment.

The configuration of a tire according to a first embodiment will be described, below. FIG. 1 and FIG. 2 are diagrams each illustrating a tire 100 according to the first embodiment.

Firstly, as shown in FIG. 1, the tire 100 includes a bead unit 10, a sidewall unit 20, a shoulder unit 30, and a tread unit 40.

The bead unit 10 is arranged at the innermost side, in a tire radial direction, out of regions configuring the tire 100. The bead unit 10 is arranged continuously along the tire circumferential direction. The bead unit 10 is a region for fixing the tire 100 to a rim. It is noted that the bead unit 10 is covered with rubber.

The sidewall unit 20 is arranged at an outer side than the bead unit 10, in the tire radial direction, out of regions configuring the tire 100. The sidewall unit 20 is arranged continuously along the tire circumferential direction. The sidewall unit 20 configures a side surface of the tire 100. It is noted that the sidewall unit 20 is covered with rubber.

The shoulder unit 30 is arranged over an interval between the sidewall unit 20 and the tread unit 40, out of the regions configuring the tire 100. The shoulder unit 30 is arranged continuously along the tire circumferential direction. It is noted that the shoulder unit 30 is covered with rubber.

The tread unit 40 is a region configuring a tire tread surface that comes into contact with a road surface, out of the regions configuring the tire 100. The tread unit 40 is arranged continuously along the tire circumferential direction. On the tire tread surface of the tread unit 40, a tread pattern is arranged which is formed by a groove extending along the tire circumferential direction (circumferential groove) and a groove extending along the tire widthwise direction (widthwise groove), for example.

Secondly, the tire 100 includes a bead core 110, a carcass layer 120, and a belt layer 130, as shown in FIG. 1 and FIG. 2.

The bead core 110 includes a bead core 110A and a bead core 110B, and configures the bead unit 10. The bead core 110 is of ring shape, and configured by a bead wire (not illustrated).

The carcass layer 120 is of toroidal shape over an interval between the bead core 110A and the bead core 110B. The carcass layer 120 is configured, for example, by a plurality of carcass cords (not illustrated) extending along the tire radial direction (or the tire widthwise direction). The carcass layer 120 is folded back toward outside the tire widthwise direction at the bead core 110.

The belt layer 130 includes a belt layer 130A and a belt layer 130B, and configures the tread unit 40. The belt layer 130 is placed outside in the tire radial direction relative to the carcass layer 120. The belt layer 130 includes a configuration in which a belt cord is covered with rubber. The belt cord arranged in the belt layer 130A may cross the belt cord arranged in the belt layer 130B.

(Configuration of Attachment Structure)

Figure 3:
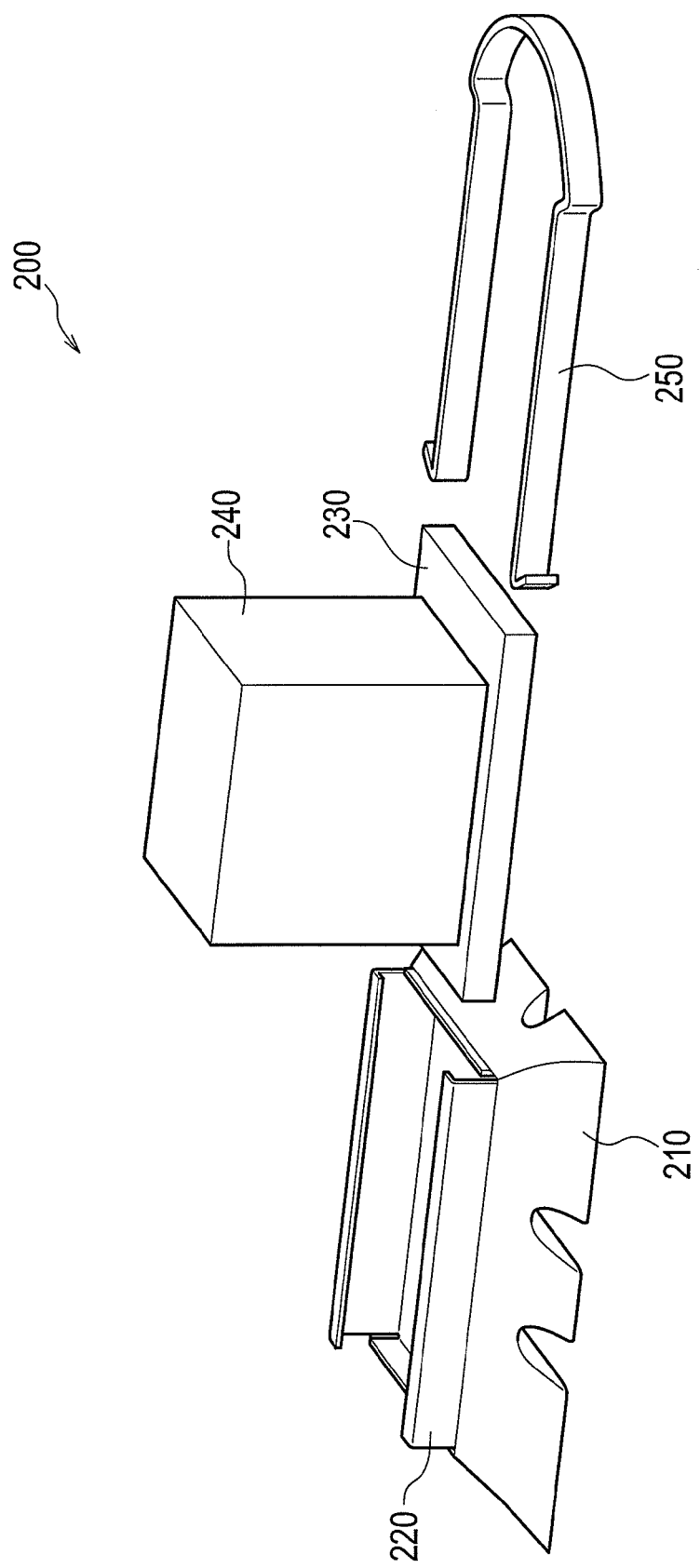
FIG. 3 is a diagram illustrating an attachment structure 200 according to the first embodiment.

The configuration of the attachment structure according to the first embodiment will be described, below. FIG. 3 is a diagram illustrating an attachment structure 200 according to the first embodiment. In this case, it should be noted that the attachment structure 200 is bonded to the inner surface of the tire 100. In particular, the attachment structure 200 is bonded to the inner surface, of the tire 100, extending along the tire circumferential direction, that is, the inner surface, of the tire 100, configuring the tread unit 40.

As shown in FIG. 3, the attachment structure 200 includes a pedestal 210, a frame 220, a base 230, a function component 240, and an insertion piece 250.

The pedestal 210 is configured by an elastic member (elastomer). For example, the pedestal 210 is configured by natural rubber or synthetic rubber. The pedestal 210 includes a pedestal lower surface bonded to the inner surface of the tire 100 and a pedestal upper surface arranged opposite the pedestal lower surface. For example, the pedestal 210 is bonded to the inner surface of the tire 100 by cure adhesion. On the pedestal upper surface of the pedestal 210, the function component 240 is arranged via the frame 220 and the base 230.

It is noted that the Young's modulus of the elastic member configuring the pedestal 210 preferably is equal to or less than 30 MPa. When the pedestal 210 is bonded to the inner surface of the tire 100 having a small outer shape, a change in curvature radius of the tread unit 40 is large, and thus, the Young's modulus of the elastic member configuring the pedestal 210 preferably is equal to or more than 1 MPa and equal to or less than 7 MPa.

The frame 220 is configured by a member having a predetermined rigidity. The frame 220 is placed on the pedestal upper surface of the pedestal 210. For example, the surface of the frame 220 is brass-plated, the pedestal 210 includes cobalt, and the frame 220 is bonded to the pedestal 210 by cure adhesion.

In the first embodiment, the frame 220 is of box shape housing the base 230. It is noted that the frame 220 will be described in detail later (see FIG. 4 to FIG. 6).

The base 230 is configured by a member having a predetermined rigidity. On the base 230, the function component 240 is loaded. In the first embodiment, the base 230 is of substantially rectangular parallelepiped shape, and housed in the frame 220.

The function component 240 includes a function of detecting a state of the tire 100. The examples of the function component 240 include a pressure sensor for detecting an inner pressure of the tire 100, a temperature sensor for detecting an inner temperature of the tire 100, and an accelerometer for detecting a rotation speed of the tire 100.

The insertion piece 250 is configured by a member having a predetermined rigidity. The insertion piece 250 is inserted into the frame 220, and regulates a movement of the base 230 housed in the frame 220. In the first embodiment, the insertion piece 250 is of U-letter shape, and regulates a movement of the base 230 in the vertical direction relative to the inner surface of the tire 100. It is noted that the insertion piece 250 will be described in detail later (see FIG. 7 and FIG. 8).

(Configuration of Frame)

Figure 4:
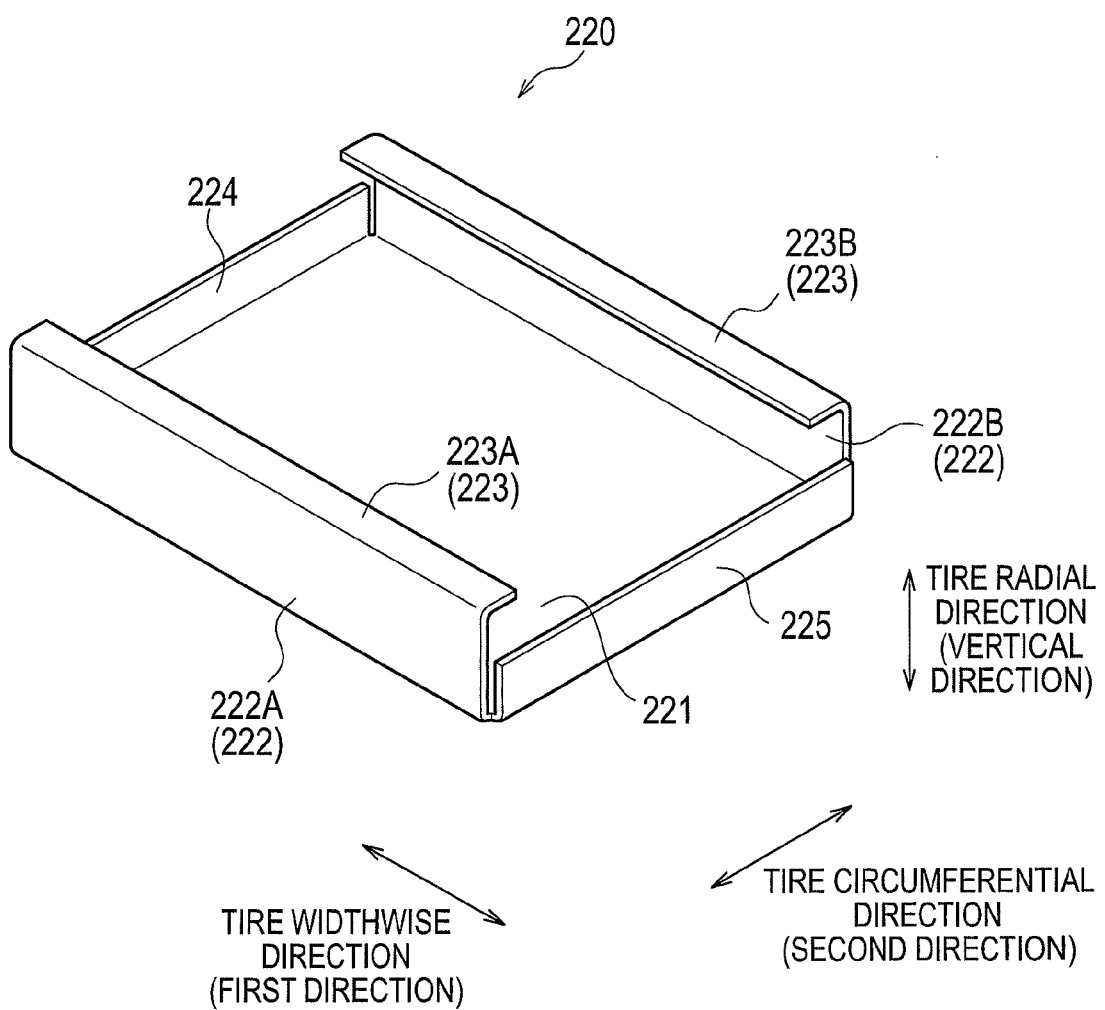
FIG. 4 is a diagram illustrating a frame 220 according to the first embodiment.

The configuration of the frame according to the first embodiment will be described, below. FIG. 4 is a diagram illustrating the frame 220 according to the first embodiment.

As shown in FIG. 4, the frame 220 includes a bottom plate 221, a pair of first wall bodies 222 (a first wall body 222A and a first wall body 222B), a pair of lateral wall engagement pieces 223 (a lateral wall engagement piece 223A and a lateral wall engagement piece 223B), a second wall body 224, and a second wall body 225.

The bottom plate 221 includes a frame lower surface placed on the pedestal upper surface and a frame upper surface arranged opposite the frame lower surface. The frame upper surface is defined by a first direction and a second direction crossing the first direction. On the frame upper surface of the bottom plate 221, the base 230 is loaded. It is noted that in the first embodiment, the bottom plate 221 is of plate shape, and includes a frame upper surface of rectangular shape.

The first wall body 222A and the first wall body 222B are arranged on the bottom plate 221. The first wall body 222A and the first wall body 222B are of shape that stands upright in the vertical direction relative to the bottom plate 221. The first wall body 222A and the first wall body 222B extend along the first direction. The first wall body 222A and the first wall body 222B are arranged with an interval in the second direction crossing the first direction.

In the first embodiment, the first wall body 222A is configured such that the tip in the vertical direction relative to the bottom plate 221 is the lateral wall engagement piece 223A that bends toward the first wall body 222B side in the second direction. The lateral wall engagement piece 223A extends along the first direction. Similarly, the first wall body 222B is configured such that the tip in the vertical direction relative to the bottom plate 221 is the lateral wall engagement piece 223B that bends toward the first wall body 222A side in the second direction. The lateral wall engagement piece 223B extends along the first direction.

The second wall body 224 is arranged on the bottom plate 221. The second wall body 224 is of shape that stands upright in the vertical direction relative to the bottom plate 221. The second wall body 224 extends along the second direction. It is noted that in the first embodiment, the second wall body 224 is of plate shape, and is arranged at one end of the bottom plate 221 in the first direction.

The second wall body 225 is arranged on the bottom plate 221. The second wall body 225 is of shape that stands upright in the vertical direction relative to the bottom plate 221. The second wall body 225 extends along the second direction. In the first embodiment, the second wall body 225 is of plate shape, and is arranged at the other end of the bottom plate 221 in the first direction.

It is noted that the second wall body 224 and the second wall body 225 are arranged with an interval in the first direction. In the first embodiment, in order that the base 230 is inserted along the first direction, in the vertical direction, at least one of heights of the second wall body 224 and the second wall body 225 preferably is lower than the height of the first wall body 222.

Thus, in the first embodiment, the bottom plate 221, the first wall body 222, the second wall body 224, and the second wall body 225 configure a box shape.

In the first embodiment, an example where the attachment structure 200 is bonded to the tire 100, where the first direction is the tire widthwise direction, will be described. To clarify the description, the first direction is called the tire widthwise direction, the second direction is called the tire circumferential direction, and the vertical direction is called the tire radial direction, below.

(Dimension of Frame)

Figure 5:
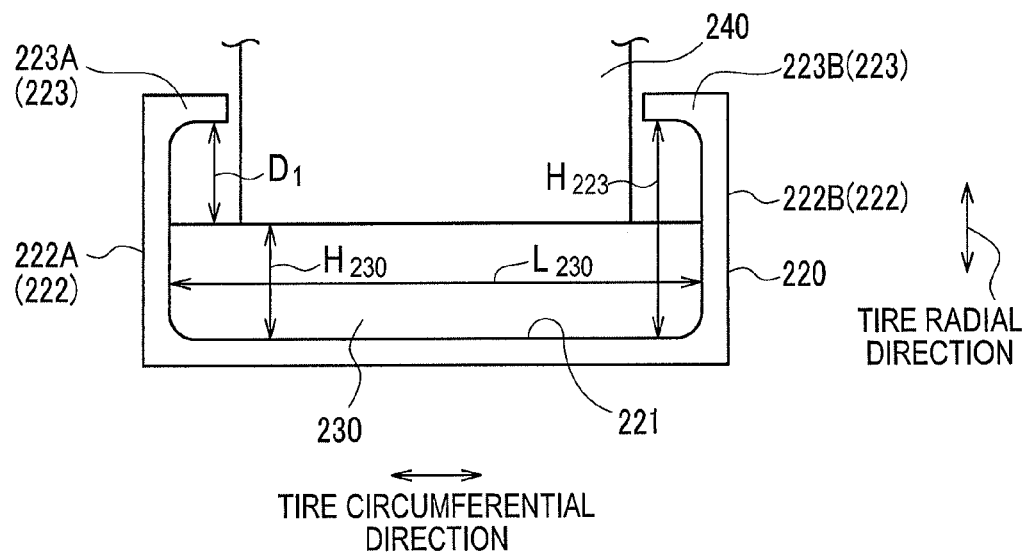
FIG. 5 is a diagram illustrating the frame 220 according to the first embodiment.
Figure 6:
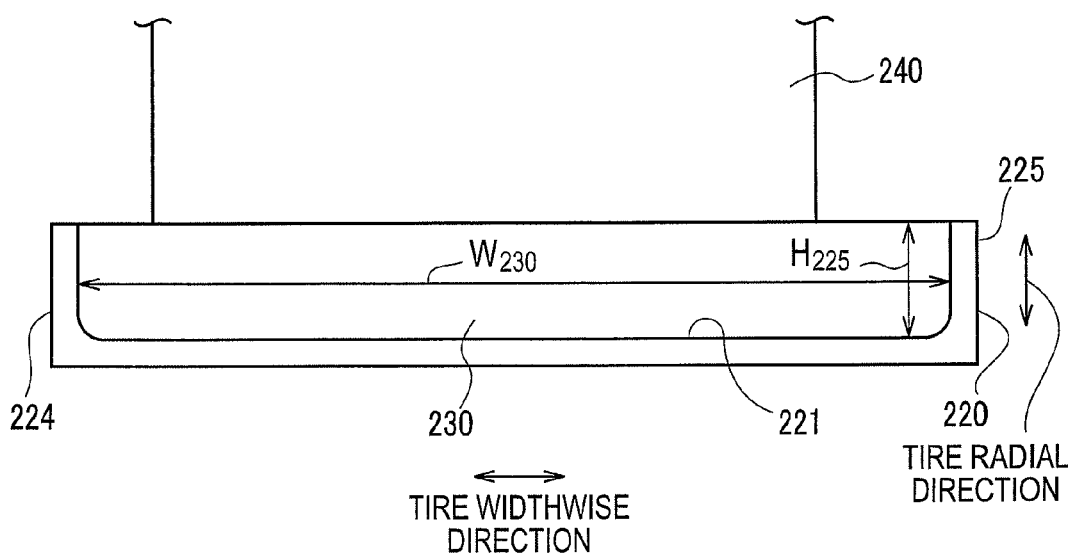
FIG. 6 is a diagram illustrating the frame 220 according to the first embodiment.

The dimension of the frame according to the first embodiment will be described, below. FIG. 5 and FIG. 6 are diagrams each illustrating the frame 220 according to the first embodiment. It is noted that FIG. 5 and FIG. 6 illustrates a state where the base 230 is housed in the frame 220.

As shown in FIG. 5, in the tire radial direction, $H_{223}$ denotes the height from the frame upper surface of the frame 220 to the lateral wall engagement piece 223. In the tire radial direction, $H_{230}$ denotes the height of the base 230. $D_1$ is a difference between the height $H_{223}$ and the height $H_{230}$. In the tire circumferential direction, $L_{230}$ denotes the length of the base 230.

In the first embodiment, in the tire circumferential direction, an interval between a pair of first wall bodies 222 is equal to the length $L_{230}$ of the base 230. Therefore, the pair of first wall bodies 222 restrains the movement of the base 230 in the tire circumferential direction. In other words, the base 230 is placed on the frame upper surface of the frame 220 so as to be fit between the pair of first wall bodies 222.

It is noted that as described below, in the tire radial direction, the difference $D_1$ is equal to the height of a pair of arm units arranged in the insertion piece 250. Therefore, the pair of arm units restrains the movement of the base 230 in the tire radial direction.

As shown in FIG. 6, in the tire radial direction, $H_{225}$ denotes the height of the second wall body 224 and the second wall body 225. In the tire widthwise direction, $W_{230}$ denotes the width of the base 230.

In the first embodiment, in the tire widthwise direction, an interval between the second wall body 224 and the second wall body 225 is equal to the width $W_{230}$ of the base 230. Therefore, the second wall body 224 and the second wall body 225 restrain the movement of the base 230 in the tire widthwise direction.

In the first embodiment, the difference between the height $H_{223}$ and the height $H_{225}$ preferably is larger than the height $H_{230}$ of the base 230. This facilitates the insertion of the base 230 within the frame 220 along the tire widthwise direction.

(Configuration of Insertion Piece)

Figure 7:
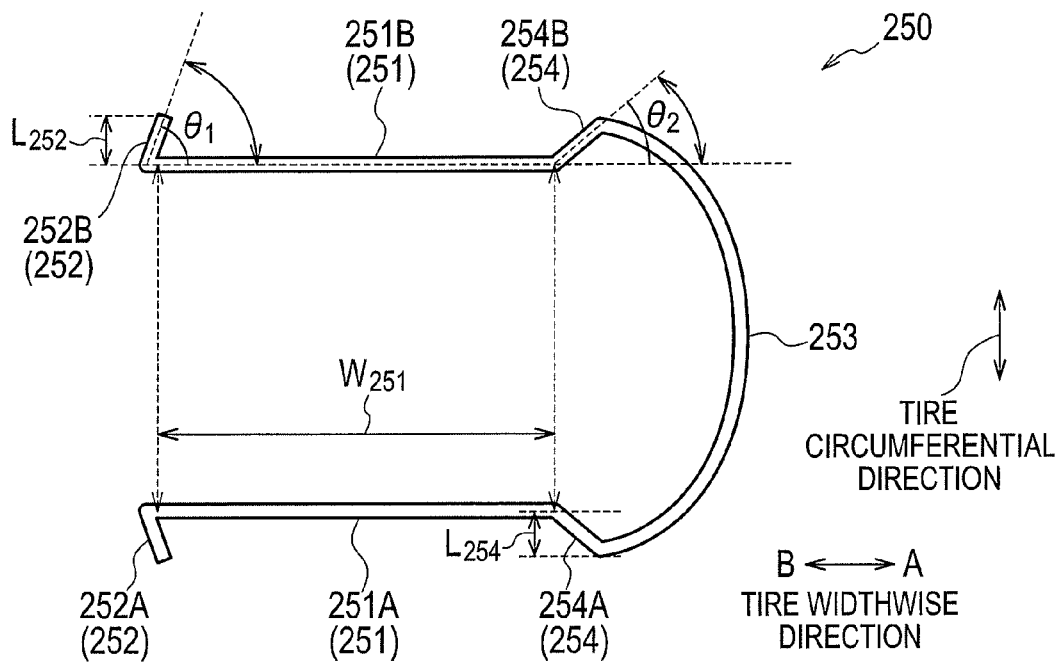
FIG. 7 is a diagram illustrating an insertion piece 250 according to the first embodiment.
Figure 8:
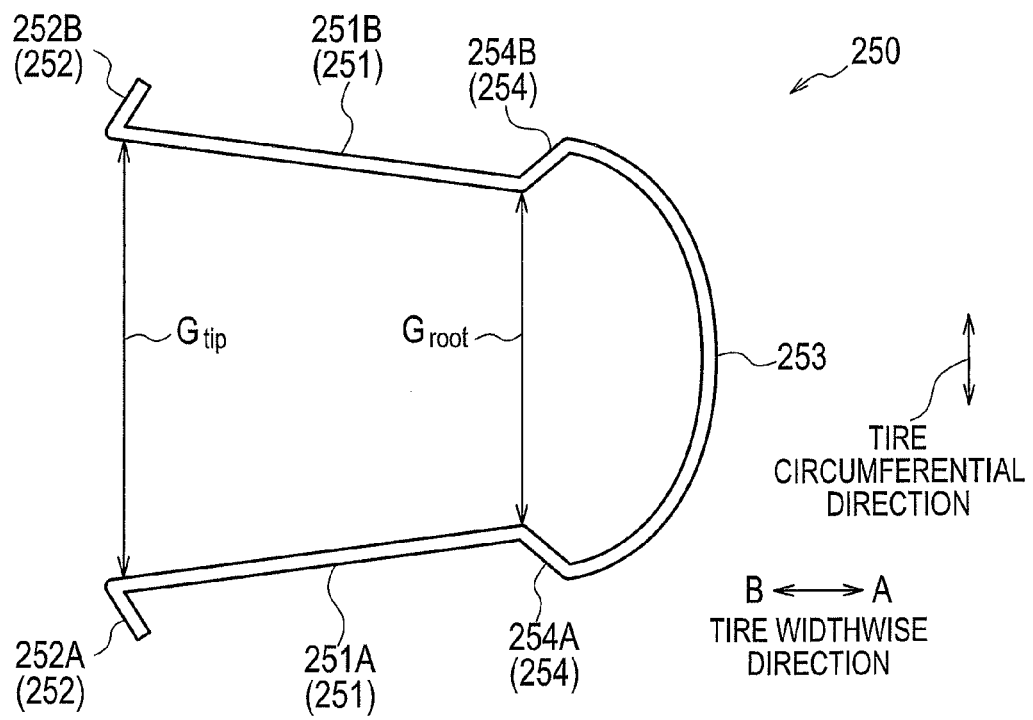
FIG. 8 is a diagram illustrating the insertion piece 250 according to the first embodiment.

The configuration of the insertion piece according to the first embodiment will be described, below. FIG. 7 and FIG. 8 are diagrams each illustrating the insertion piece 250 according to the first embodiment. It is noted that FIG. 7 illustrates a state obtained after the insertion piece 250 is attached to the frame 220, and FIG. 8 illustrates a state obtained before the insertion piece 250 is attached to the frame 220.

As shown in FIG. 7 and FIG. 8, the insertion piece 250 includes a pair of arm units 251 (an arm unit 251A and an arm unit 251B), a pair of tip folded pieces 252 (a tip folded piece 252A and a tip folded piece 252B), a linkage unit 253, a pair of projection portions 254 (a projection portion 254A and a projection portion 254B).

The arm unit 251A and the arm unit 251B extend along the tire widthwise direction. Further, the arm unit 251A and the arm unit 251B have flexibility in the tire circumferential direction. For example, the arm unit 251A and the arm unit 251B are of flat plate shape of which the thickness in the tire circumferential direction is smaller than the thickness in the tire radial direction.

The tip of the arm unit 251A configures the tip folded piece 252A that bends toward outside the insertion piece 250 in the tire circumferential direction. Similarly, the tip of the arm unit 251B configures the tip folded piece 252B that bends toward outside the insertion piece 250 in the tire circumferential direction.

An angle $\theta_1$ formed between the main body of the arm unit 251 and the tip folded piece 252 preferably is an acute angle. That is, the tip (tip folded piece 252) of the arm unit 251 is folded back so that the angle $\theta_1$ is acute.

The tip folded piece 252 is configured to be caught in the first wall body 222 after the insertion piece 250 is attached to the frame 220. That is, the tip folded piece 252 has a function of preventing the insertion piece 250 from being pulled out along the tire widthwise direction.

The tip folded piece 252 restrains the insertion piece 250 from being pulled out toward an A side in the tire widthwise direction after the insertion piece 250 is attached to the frame 220.

The linkage unit 253 is a region for linking roots of the arm unit 251A and the arm unit 251B. The linkage unit 253 includes the projection portion 254A that bends toward outside the insertion piece 250 in the tire circumferential direction from the root of the arm unit 251A. Similarly, the linkage unit 253 includes the projection portion 254B that bends toward outside the insertion piece 250 in the tire circumferential direction from the root of the arm unit 251B.

An angle $\theta_2$ formed between an extended line of the main body of the arm unit 251 and the projection portion 254 preferably is an acute angle. That is, a region (the projection portion 254) that continues to the root of the arm unit 251 is folded back so that the angle $\theta_2$ is acute.

The projection portion 254 has a function of preventing the insertion piece 250 from entering a B side in the tire widthwise direction after the insertion piece 250 is attached to the frame 220. On the other hand, it is possible to remove the tip folded piece 252 from being caught, by moving the insertion piece 250 to the B side in the tire widthwise direction, when the insertion piece 250 is removed from the frame 220.

In this case, $L_{252}$ denotes the length of the tip folded piece 252 in the tire circumferential direction. $L_{254}$ denotes the length of the projection portion 254 in the tire circumferential direction. The length $L_{252}$ preferably is equal to the length $L_{254}$. As a result, the insertion piece 250 becomes less likely to be pulled out of the frame 220.

Further, in the tire widthwise direction, $W_{251}$ denotes the length of the arm unit 251. The length $W_{251}$ of the arm unit 251 preferably is equal to the length of the first wall body 222 in the tire widthwise direction. As a result, the insertion piece 250 becomes less likely to be pulled out of the frame 220.

It is noted that as shown in FIG. 8, before the insertion piece 250 is attached to the frame 220, an interval $G_{tip}$ of the tips of the arm unit 251 preferably is larger than an interval $G_{root}$ of the roots of the arm unit 251. By the flexibility provided in the arm unit 251, the insertion piece 250 is less likely to be pulled out of the frame 220.

(Configuration of Pedestal)

Figure 9:
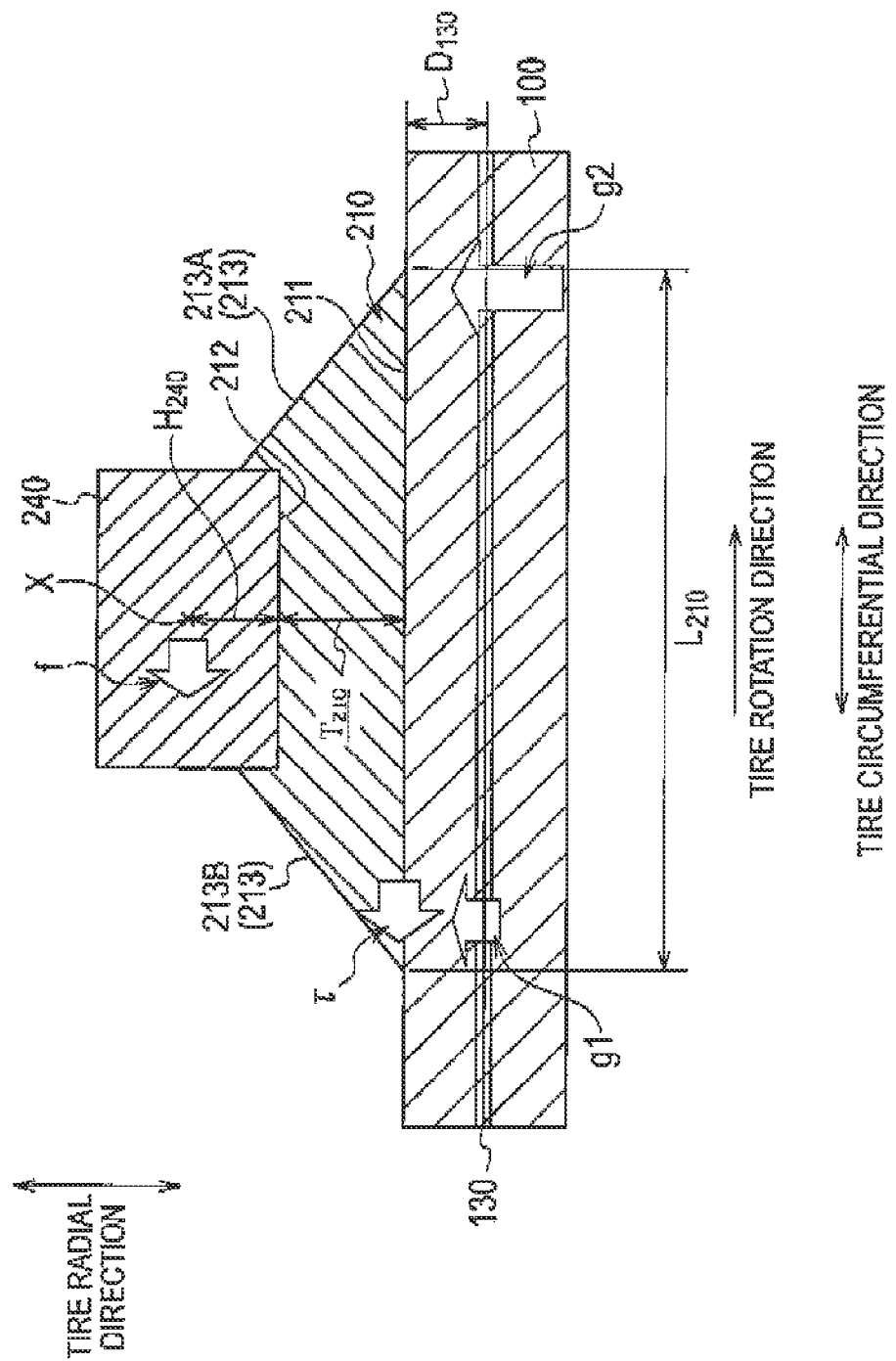
FIG. 9 is a diagram illustrating a pedestal 210 according to the first embodiment.

The configuration of the pedestal according to the first embodiment will be described, below. FIG. 9 is a diagram illustrating the pedestal 210 according to the first embodiment. It should be noted that in FIG. 9, the frame 220 and the base 230 are omitted.

As shown in FIG. 9, the pedestal 210 includes a pedestal lower surface 211 bonded to the inner surface of the tire 100, a pedestal upper surface 212 arranged opposite to the pedestal lower surface 211, and a pedestal inclined surface 213 (a pedestal inclined surface 213A and a pedestal inclined surface 213B) that continues from the end of the pedestal lower surface 211 to the end of the pedestal upper surface 212.

In this case, the pedestal inclined surface 213A is an inclined surface that continues from one end of the pedestal lower surface 211 to one end of the pedestal upper surface 212, in the tire circumferential direction. The pedestal inclined surface 213B is an inclined surface that continues from the other end of the pedestal lower surface 211 to the other end of the pedestal upper surface 212, in the tire circumferential direction.

In the first embodiment, an adhesive length where the pedestal lower surface 211 is bonded to the inner surface of the tire 100 preferably is equal to or less than 45 mm so that the adhesive length can be read from an evaluation result described later. Further, the thickness of the pedestal 210 in the tire radial direction preferably is larger than 1 mm so that the thickness can be read from an evaluation result described later.

Hereinafter, the meaning of each symbol is as follows: $M_{240}$ denotes the mass of the function component 240; $H_{240}$ denotes the height of a center of gravity X of the function component 240 in the tire radial direction; $T_{210}$ denotes the thickness of the pedestal 210 in the tire radial direction; In other words, $T_{210}$ denotes the thickness from the pedestal lower surface 211 to the pedestal upper surface 212 in the tire radial direction; R denotes the radius of the tire 100; $L_{210}$ denotes an adhesive length where the pedestal lower surface 211 is bonded to the inner surface of the tire 100, in the tire circumferential direction; $W_{210}$ denotes an adhesive width obtained by bonding the pedestal lower surface 211 onto the inner surface of the tire 100, in the tire widthwise direction; V denotes a target durability speed; and A, B, and C denote a coefficient.

Further, g1 denotes a centripetal force generated at the other end (front-side end in a tire rotation direction) of the pedestal lower surface 211, and g2 denotes a centripetal force generated at one end (rear-side end in the tire rotation direction) of the pedestal lower surface 211. f denotes an inertia force exerted on the function component 240. τ denotes a shearing stress generated at the end of the pedestal lower surface 211. τmax denotes a maximum shearing stress generated at the end of the pedestal lower surface 211. In this case, τmax is a maximum shearing stress generated at the other end (front-side end in the tire rotation direction) of the pedestal lower surface 211. A, B, and C denote coefficients. $D_{130}$ denotes a depth from the inner surface of the tire 100 to a reinforcement layer (belt layer 130 arranged at the innermost side in the tire radial direction) arranged in the tire 100 in the tire radial direction. In this case, it may be possible to consider $D_{130}$ as a constant (for example, 5).

In this case, τmax is defined by the inertia force f and the adhesive length $L_{210}$, and thus, expressed by the following equation (1):

$$\tau max = A * f * \exp(-B * L_{210}) \quad \text{Equation (1)}$$

In this case, the inertia force f is generated by a difference between the centripetal force g1 and the centripetal force g2. Therefore, the inertia force f is proportional to the difference between the centripetal force g1 and the centripetal force g2. Further, it is known from an experiment result that the inertia force f is a moment component where the belt layer 130 arranged at the innermost side in the tire radial direction is the center of rotation. Therefore, in the tire radial direction, the inertia force f is proportional to the height from the belt layer 130 to the center of gravity X of the function component 240 (that is, "$H_{240}+T_{210}+D_{130}$"). From these relationships, the inertia force f can be expressed by the following equation (2):

$$f = C * (H_{240}+T_{210}+D_{130}) * M_{240} * V^2/R \quad \text{Equation (2)}$$

On the basis of the equation (1) and the equation (2), the following equation (3) and equation (4) are derived:

$$\tau max = A * C * (H_{240}+T_{210}+D_{130}) * M_{240} * V^2/R * \exp(-B * L_{210}) \quad \text{Equation (3)}$$

$$\tau max/(A*C) = (H_{240}+T_{210}+D_{130}) * M_{240} * V^2/R * \exp(-B * L_{210}) \quad \text{Equation (4)}$$

In this case, when the adhesive length $L_{210}$ and the thickness $T_{210}$ are defined so that a value of "$(H_{240}+T_{210}+D_{130})*M_{240}*V^2/R*\exp(-B*L_{210})$" does not exceed a value of τmax/(A*C), the detachment of the pedestal 210 is restrained.

In other words, the adhesive length $L_{210}$ preferably is equal to or more than a value that satisfies the relationship of the equation (4). Further, the thickness $T_{210}$ preferably is equal to or less than a value that satisfies the relationship of the equation (4).

(Assembly of Attachment Structure)

Figure 10:
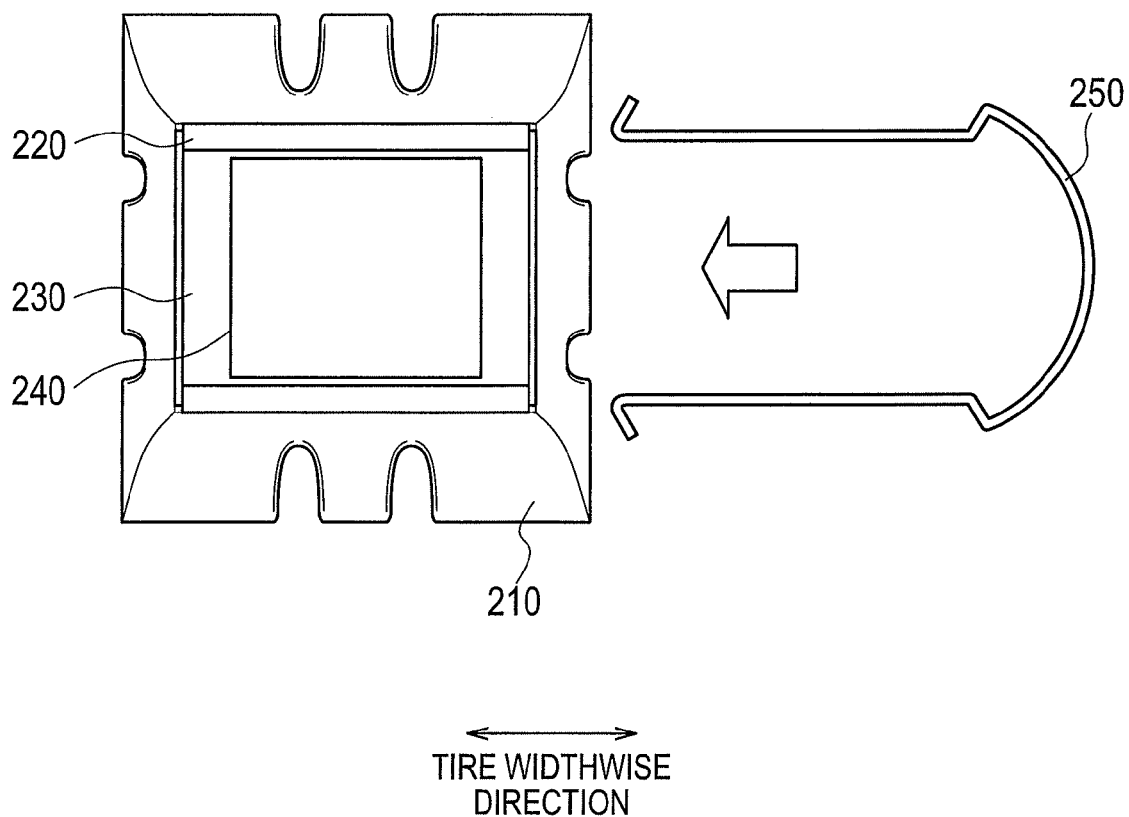
FIG. 10 is a diagram describing assembly of the attachment structure 200 according to the first embodiment.
Figure 11:
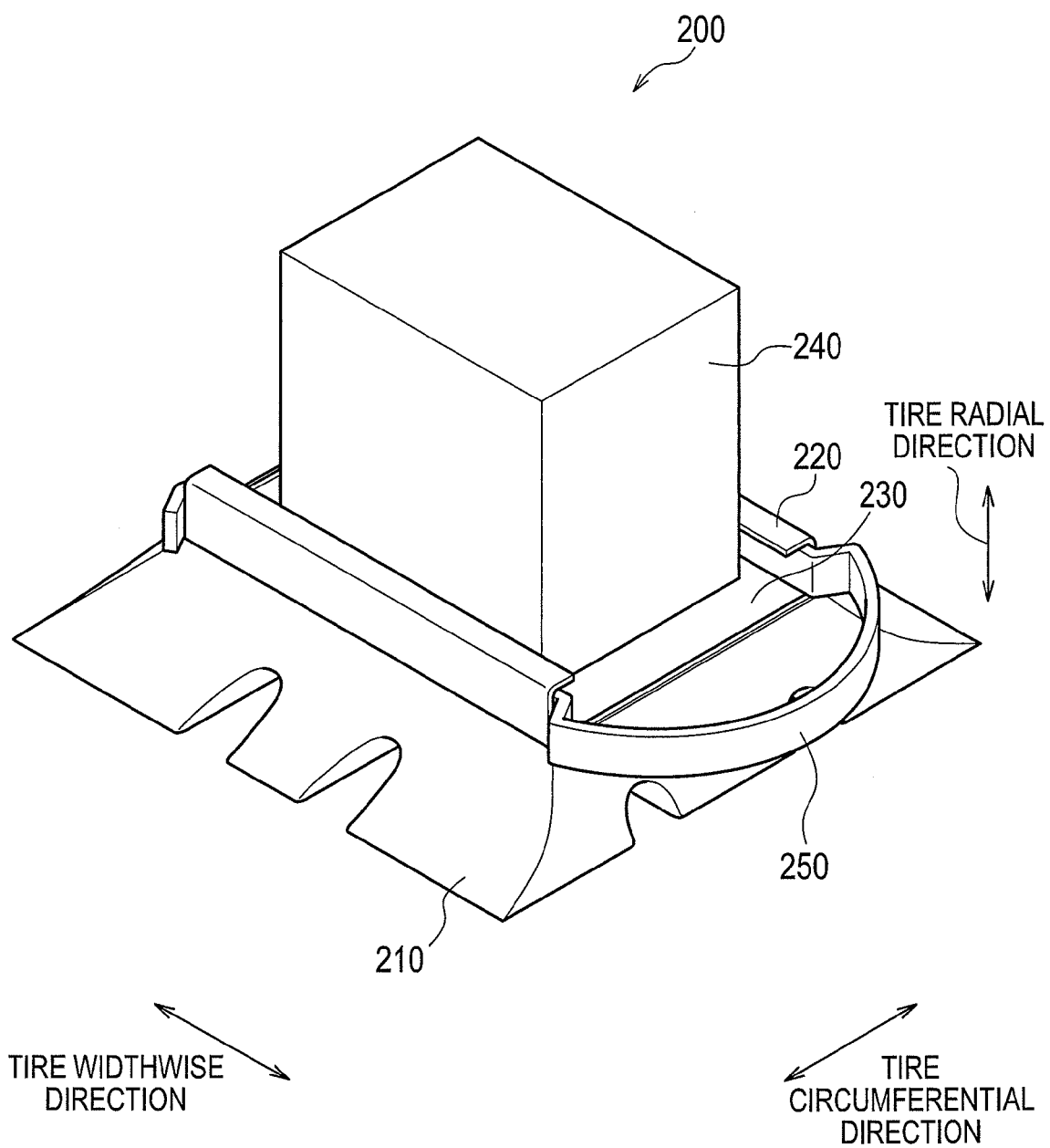
FIG. 11 is a diagram describing assembly of the attachment structure 200 according to the first embodiment.
Figure 12:
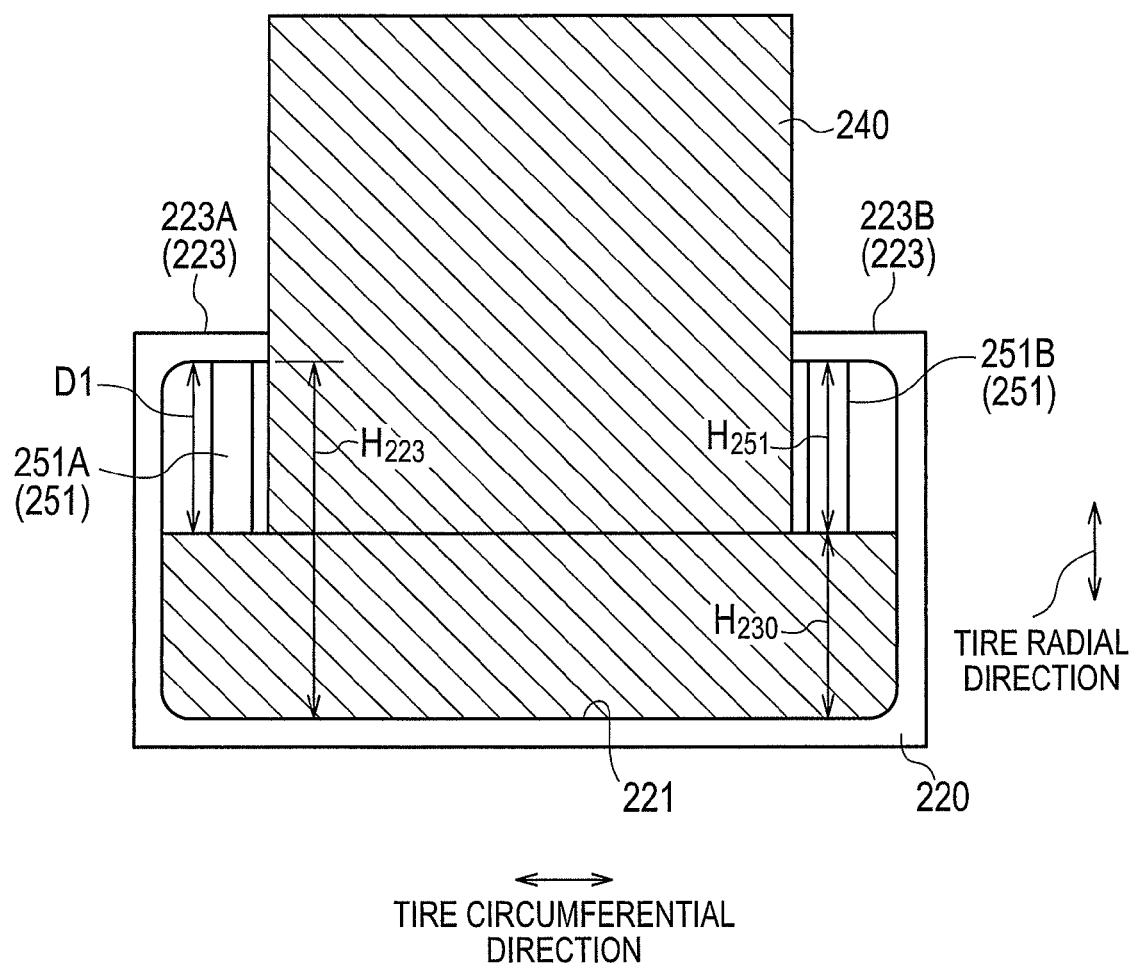
FIG. 12 is a diagram describing assembly of the attachment structure 200 according to the first embodiment.

Hereinafter, assembly of the attachment structure according to the first embodiment will be described. FIG. 10 to FIG. 12 are diagrams each describing assembly of the attachment structure 200 according to the first embodiment.

As shown in FIG. 10, the base 230 on which the function component 240 is loaded is placed in the frame 220 attached to the pedestal upper surface of the pedestal 210. Next, the insertion piece 250 is inserted along the tire widthwise direction. In particular, the insertion piece 250 is placed so that the arm unit 251 is inserted along the tire widthwise direction between the first wall body 222 and the function component 240. As a result, as shown in FIG. 11, the assembly of the attachment structure 200 is completed.

It is noted that as shown in FIG. 12, in the tire radial direction, the height $H_{223}$ from the bottom surface arranged on the bottom plate 221 to the lateral wall engagement piece 223 preferably is equal to a total of the height $H_{230}$ of the base 230 and the height $H_{251}$ of the arm unit 251. That is, the height $H_{251}$ of the arm unit 251 is equal to the difference $D_1$ between the height $H_{223}$ and the height $H_{230}$.

(Operation and Effect)

In the first embodiment, the adhesive length where the pedestal lower surface 211 is bonded to the inner surface of the tire 100 is equal to or less than 45 mm. That is, the adhesive length is an appropriate value, and thus, the detachment from the inner surface of the tire 100 is restrained. Further, there is no need of utilizing soft rubber, and thus, a decrease in durability of the pedestal 210 is restrained.

[Stress Generated Between Pedestal and Inner Surface of Tire]

Hereinafter, the stress generated between the pedestal 210 (pedestal lower surface) and the inner surface of the tire 100 (inner liner) will be described.

(Wobbling)

Figure 13:
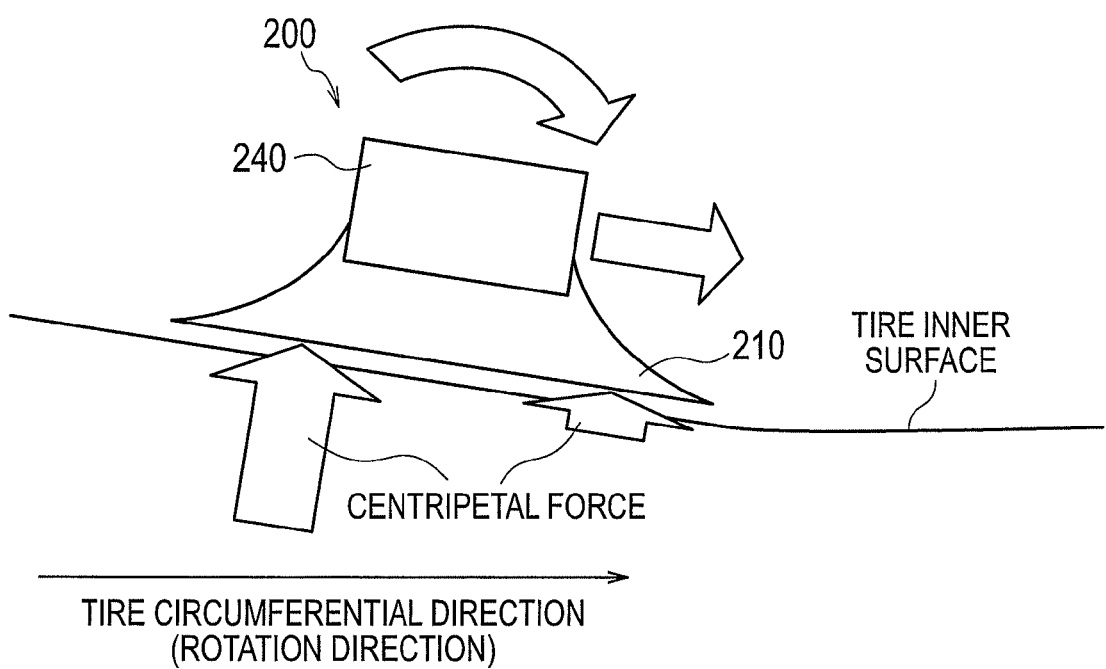
FIG. 13 is a diagram describing stress generated between the pedestal 210 and the tire 100.

Hereinafter, a wobbling will be described with reference to FIG. 13. As shown in FIG. 13, when the tire 100 comes into contact with the road surface in a state where the attachment structure 200 is bonded to the inner surface of the tire 100, the centripetal force generated along with the rotation of the tire 100 differs depending on each region of attachment structure 200.

Specifically, a case is considered where in the tire circumferential direction (rotation direction), the tire 100 corresponding to a front portion of the attachment structure 200 comes into contact with the road surface and the tire 100 corresponding to a rear portion of the attachment structure 200 does not come into contact with the road surface. In such a case, the centripetal force in the front portion of the attachment structure 200 is smaller than the centripetal force in the rear portion of the attachment structure 200. Therefore, in the tire circumferential direction (rotation direction), a stress that fells forward relative to the attachment structure 200 is applied.

Similarly, a case is considered where in the tire circumferential direction (rotation direction), the tire 100 corresponding to the front portion of the attachment structure 200 does not come into contact with the road surface and the tire 100 corresponding to the rear portion of the attachment structure 200 comes into contact with the road surface. In such a case, the centripetal force in the rear portion of the attachment structure 200 is smaller than the centripetal force in the front portion of the attachment structure 200. Therefore, in the tire circumferential direction (rotation direction), a stress that fells backward relative to the attachment structure 200 is applied.

When the stress that fells forward or the stress that fells backward (that is, a front-rear stress) is applied repeatedly, along with the rotation of the tire 100, to the attachment structure 200, behavior in which the attachment structure 200 acts as if to wobble the head backward and forward is generated. This generates a stress (stress generated by the front and back input) generated between the pedestal 210 (pedestal lower surface) and the inner surface of the tire 100 (inner liner).

(Deformation of Inner Liner)

Figure 14:
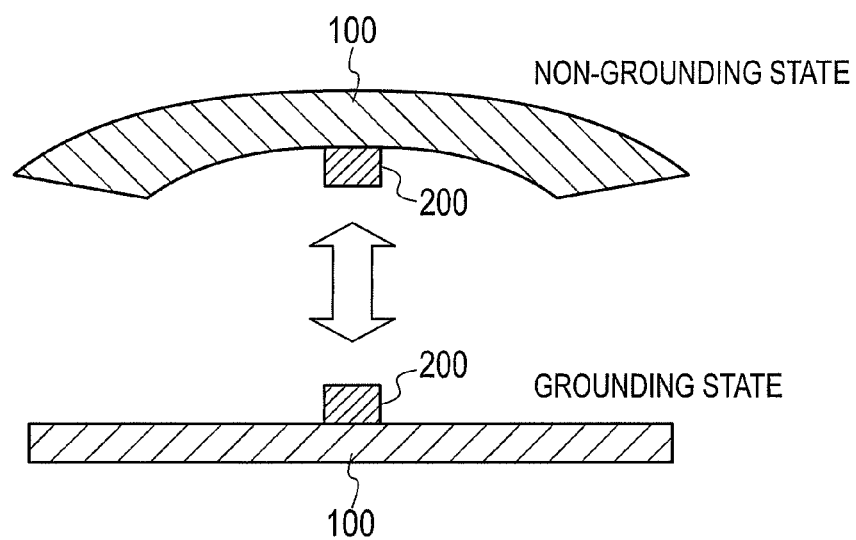
FIG. 14 is a diagram describing stress generated between the pedestal 210 and the tire 100.

Hereinafter, a deformation of the inner liner will be described with reference to FIG. 14. As shown in FIG. 14, between a state where the tire 100 comes into contact with a road surface (grounding state) and a state where the tire 100 does not come into contact with the road surface (non-grounding state), the shape of the inner liner differs. That is, in the grounding state, the inner liner is of flat shape, and in the non-grounding state, the inner liner is of arc shape.

When the grounding state (flat shape) and the non-grounding state (arc shape) are repeated along with the rotation of the tire 100, a stress (stress generated by bending input) generated between the pedestal 210 (pedestal lower surface) and the inner surface (inner liner) of the tire 100 occurs.

(Relationship Between Dimension and Stress)

Hereinafter, the relationship between each dimension and the stress will be described with reference to FIG. 15. In particular, as each dimension, in the tire circumferential direction, the adhesive length $L_{210}$ obtained when the pedestal lower surface 211 is bonded to the inner surface of the tire 100, in the tire widthwise direction, the adhesive width $W_{210}$ obtained when the pedestal lower surface 211 is bonded to the inner surface of the tire 100, the thickness of $T_{210}$ of the pedestal 210 in the tire radial direction, the width $W_{240}$ of the function component 240 in the tire widthwise direction, and the length $L_{240}$ of the function component 240 in the tire circumferential direction are changed. As the stress, the stress generated by the front and back input (at the time of the front and back input) and the stress generated by the bending input (at the time of bending input) are measured.

It is noted that the width $W_{240}$ of the function component 240 is, in the tire widthwise direction, the adhesive length where the function component 240 is bonded to the pedestal upper surface 212. Further, the length $L_{240}$ of the function component 240 is, in the tire circumferential direction, the adhesive length where the function component 240 is bonded to the pedestal upper surface 212.

Further, a common condition is that the Young's modulus of the elastic member configuring the pedestal 210 is 7 MPa.

Herein, as the stress generated by the front-back input, 300 N of the inertia force f exerted on the function component 240 (the center of gravity X) is added, and then, the stress generated at the end of the pedestal 210 (pedestal lower surface 211) in the tire circumferential direction is measured. As the stress generated by the bending input, the pedestal lower surface 211 is artificially deformed so that the curvature radius R of the pedestal lower surface 211 (the inner surface of the tire 100) is 300 mm in the tire circumferential direction, and the stress generated at the end of the pedestal 210 (the pedestal lower surface 211) in the tire circumferential direction is measured.

Figure 15:
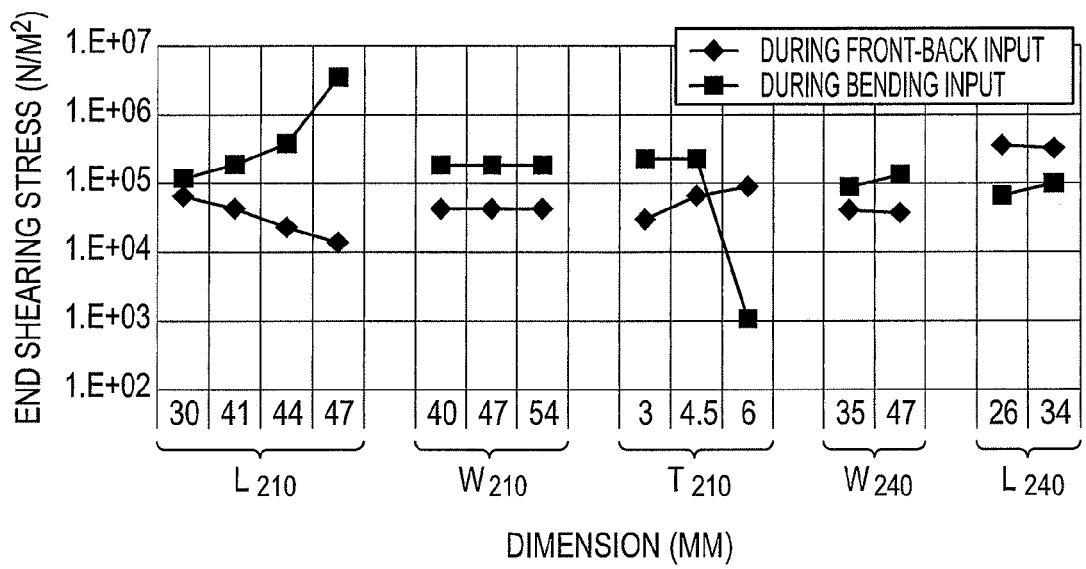
FIG. 15 is a diagram describing a relationship between a dimension and a stress.

As shown in FIG. 15, the larger the adhesive length $L_{210}$ of the pedestal 210, the further the stress generated by front-back input decreases. On the other hand, the larger the adhesive length $L_{210}$ of the pedestal 210, the further the stress generated by the bending input increases. In particular, when the adhesive length $L_{210}$ of the pedestal 210 exceeds 45 mm, the stress generated by the bending input significantly increases.

A similar tendency is confirmed even when the size of the tire 100 differs, and in particular, in consideration of the decrease in stress generated by the bending input, the adhesive length $L_{210}$ of the pedestal 210 preferably is equal to or less than 45 mm.

[Relationship Between Adhesive Length of Pedestal and Durability Limit]

Figure 16:
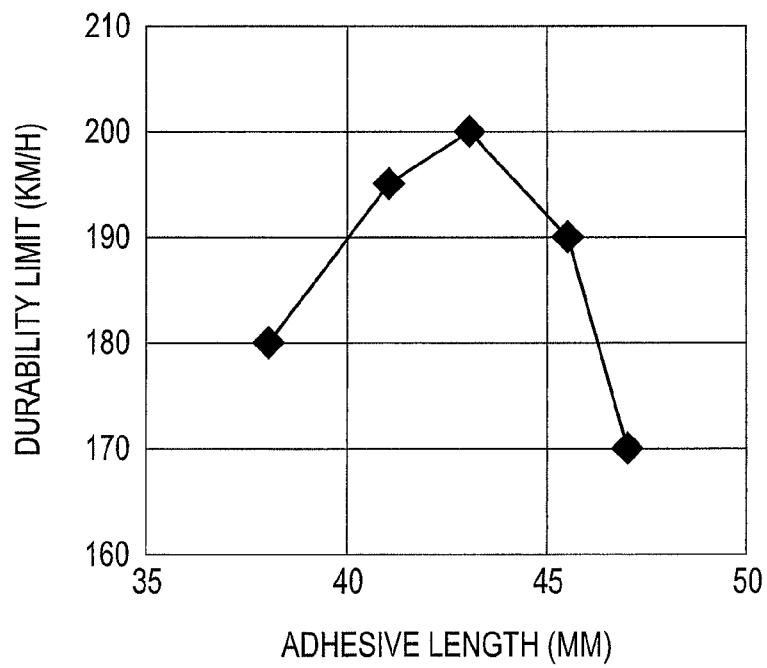
FIG. 16 is a diagram describing a relationship between an adhesive length and a durability limit of the pedestal 210.

Hereinafter, a relationship between the adhesive length $L_{210}$ of the pedestal 210 and a durability limit will be described with reference to FIG. 16. The durability limit is shown by a rotation speed of the tire 100 when the pedestal 210 is destructed. As shown in FIG. 16, under a certain condition, when the adhesive length $L_{210}$ of the pedestal 210 is 43 mm, the highest durability limit is achieved.

However, in a case where a target durability speed V is low or in a case where a mass $M_{240}$ of the function component 240 is light, when the adhesive length $L_{210}$ is 43 mm, the highest durability limit is not necessarily achieved. Therefore, as described above, the adhesive length $L_{210}$ preferably is equal to or more than a value that satisfies the following equation (4).

$$\tau max/(A*C)=(H_{240}+T_{210}+D_{130})*M_{240}*V^2/R*\exp(-B*L_{210}) \quad \text{Equation (4)}$$

Figures 17, 18:
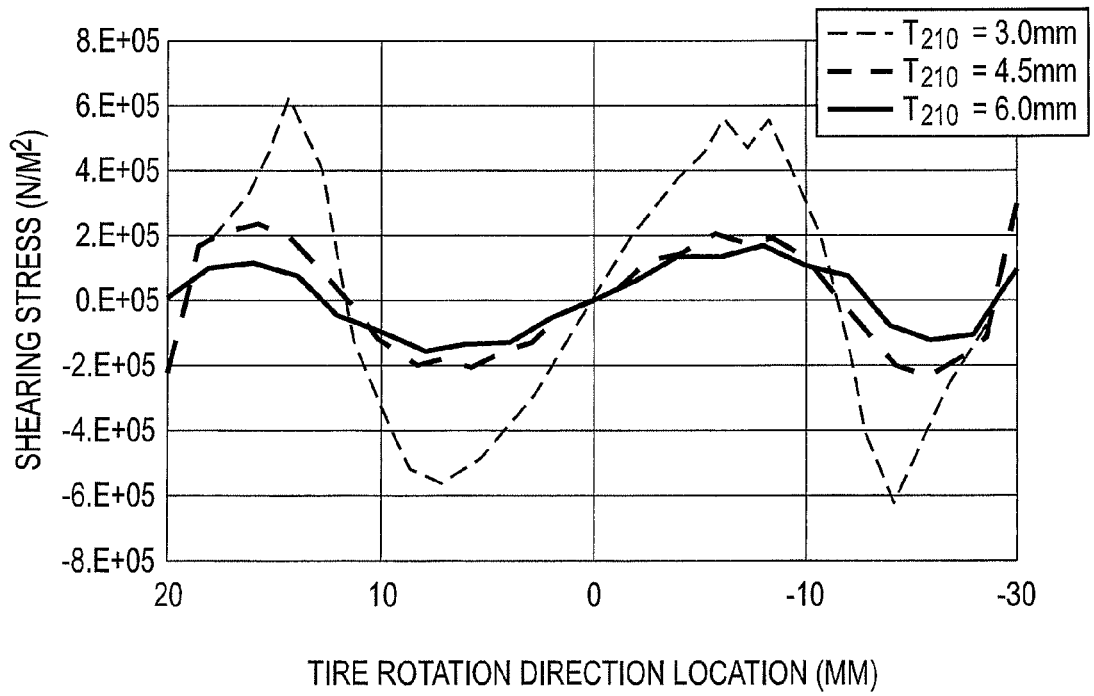
FIG. 17 is a diagram describing an adhesive length of the pedestal 210.
FIG. 18 is a diagram describing a relationship between the thickness of the pedestal 210 and a stress.

For example, as in an example 2 illustrated in FIG. 17, when the mass $M_{240}$ of the function component 240 is light, the adhesive length $L_{210}$ of the pedestal 210 may be short. Further, as in an example 3 illustrated in FIG. 17, when the target durability speed V is low, the adhesive length $L_{210}$ of the pedestal 210 may be short.

[Relationship Between Thickness of Pedestal and Stress]

Hereinafter, the relationship between the thickness $T_{210}$ of the pedestal 210 and the stress will be described with reference to FIG. 18. In FIG. 18, a horizontal axis indicates a location of the pedestal 210 (the pedestal lower surface) in the tire circumferential direction, where the center of the pedestal 210 (the pedestal lower surface) in the tire circumferential direction is expressed by "0". Further, the vertical axis indicates the shearing stress generated in response to the bending input, where the orientation of the shearing stress is expressed in positive and negative.

As shown in FIG. 18, the smaller the thickness $T_{210}$ of the pedestal 210, the larger the shearing stress generated in a portion other than the end of the pedestal 210 (pedestal lower surface 211) in the tire circumferential direction. Therefore, it is preferable that the thickness $T_{210}$ of the pedestal 210 be larger.

However, as described above, the maximum shearing stress relies on the target durability speed V and the mass $M_{240}$ of the function component 240. Therefore, as described above, the thickness $T_{210}$ preferably is equal to or less than a value that satisfies the following equation (4):

$$\tau max/(A*C)=(H_{240}+T_{210}+D_{130})*M_{240}*V^2/R*\exp(-B*L_{201}) \quad \text{Equation (4)}$$

For example, as in an example 2 illustrated in FIG. 19, when the mass $M_{240}$ of the function component 240 is light, the thickness $T_{210}$ of the pedestal 210 may be large. Further, as in an example 3 illustrated in FIG. 17, when the target durability speed V is low, the thickness $T_{210}$ of the pedestal 210 may be large.

It is noted that as shown in FIG. 15, in view of the shearing stress generated by the front-back input at the end of the pedestal lower surface 211 in the tire circumferential direction, the thickness $T_{210}$ of the pedestal 210 preferably is small. However, as shown in FIG. 18, the smaller the thickness $T_{210}$ of the pedestal 210, the more the shearing stress generated by the bending input in a portion other than the end of the pedestal lower surface 211 in the tire circumferential direction increases. Therefore, the thickness $T_{210}$ of the pedestal 210 preferably is larger than 1 mm. Alternately, the thickness $T_{210}$ of the pedestal 210 more preferably is larger than 3 mm.

Hereinafter, a relationship between the thickness of $T_{210}$ of the pedestal 210 and a durability limit will be described with reference to FIG. 20. The durability limit is shown by a rotation speed of the tire 100 when the pedestal 210 is destructed.

Specifically, the pedestals 210 was affixed to the inner surface (inner liner) of the tire 100, and the tire 100 was rotated after which the durability limit of the pedestal 210 was measured.

Tire size=195/65R15
Tire inner pressure=280 kPa
Load=495 kgf

As shown in FIG. 20, when the thickness $T_{210}$ of the pedestal 210 is 1 mm, the inner liner or a ply cord arranged immediately below the pedestal 210 is damaged. However, when the thickness $T_{210}$ of the pedestal 210 is more than 1 mm, although the detachment of the pedestal 210 occurs, the tire 100 (the inner liner or the ply cord) is not damaged. Therefore, the thickness $T_{210}$ of the pedestal 210 preferably is larger than 1 mm. Alternately, the thickness $T_{210}$ of the pedestal 210 more preferably is larger than 3 mm.

[Shape of Pedestal Inclined Surface]

Figure 21:
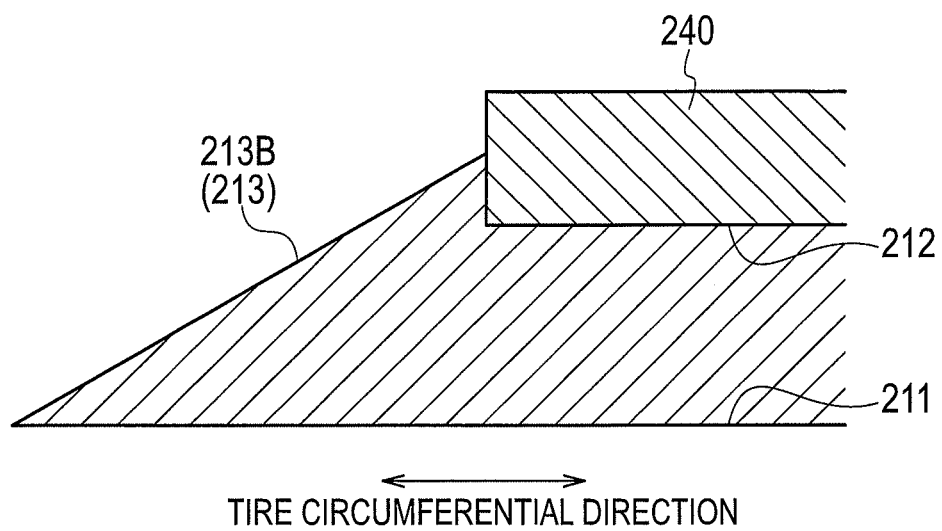
FIG. 21 is a diagram describing the shape of a pedestal inclined surface 213.

Hereinafter, the shape of the pedestal inclined surface 213 will be described with reference to FIG. 21 and FIG. 22. The pedestal inclined surface 213 may be of flat shape (of straight line shape), as shown in FIG. 21; however, as shown in FIG. 22, a shape recessed toward the center of the pedestal 210 is preferable.

Figure 22:
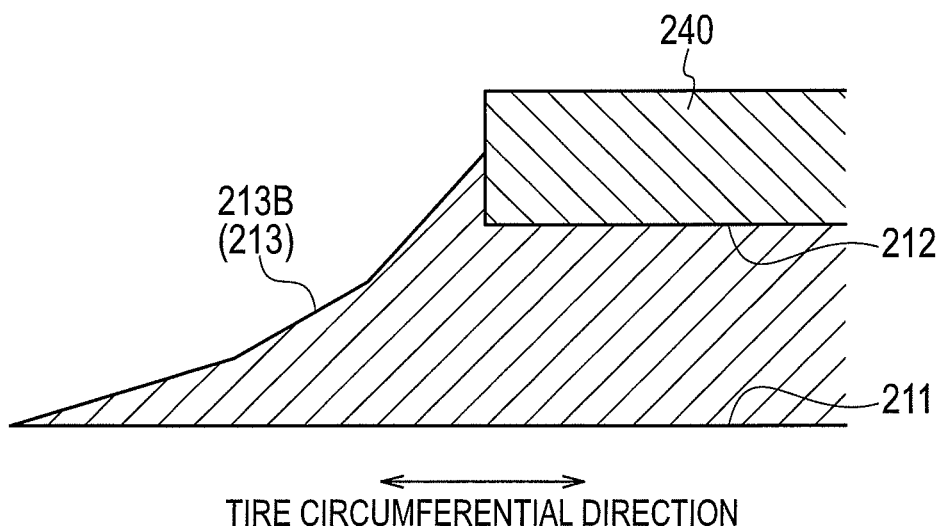
FIG. 22 is a diagram describing the shape of the pedestal inclined surface 213.

In a case illustrated in FIG. 22, the deeper the recess, the further the shearing stress generated between the inner surface of the tire 100 and the pedestal lower surface 211 decreases. Therefore, in a lateral view of the pedestal 210 seen from outside the tire widthwise direction, the pedestal inclined surface 213 preferably is of arch shape having a curvature radius R of equal to or less than 10 mm.

Figure 23:
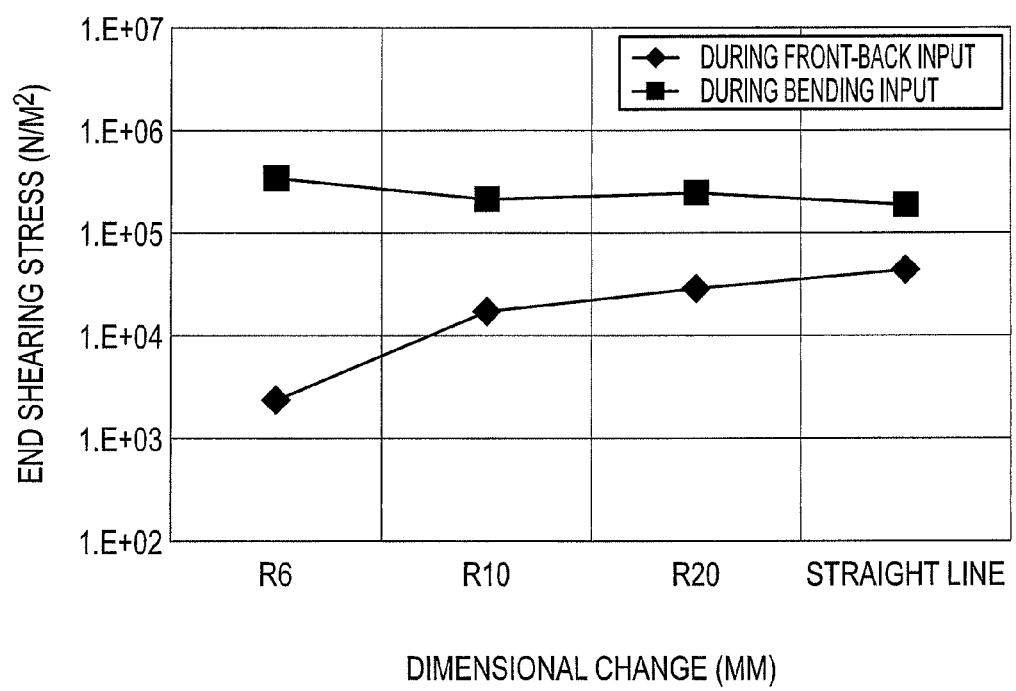
FIG. 23 is a diagram describing a relationship between a curvature radius of the pedestal inclined surface 213 and a shearing stress.

Hereinafter, the relationship between the curvature radius of the pedestal inclined surface 213 and the shearing stress will be described with reference to FIG. 23. In FIG. 23, the vertical axis indicates the stress (end shearing stress) generated at the end of the pedestal 210 (pedestal lower surface 211) in the tire circumferential direction. The horizontal axis indicates the curvature radius of the pedestal inclined surface 213.

As shown in FIG. 23, the smaller the curvature radius of the pedestal inclined surface 213, the smaller the stress generated by front-back input becomes. In particular, when the curvature radius R of the pedestal inclined surface 213 is equal to or less than 10 mm, the stress generated by front-back input decreases.

[Relationship of Adhesive Width]

Hereinafter, the relationship between the adhesive width obtained when the pedestal 210 (pedestal lower surface 211) is bonded to the inner surface of the tire 100 and the adhesive width obtained when the function component 240 is bonded to the pedestal 210 (pedestal upper surface 212) will be described with reference to FIG. 24 and FIG. 25.

Figure 24:
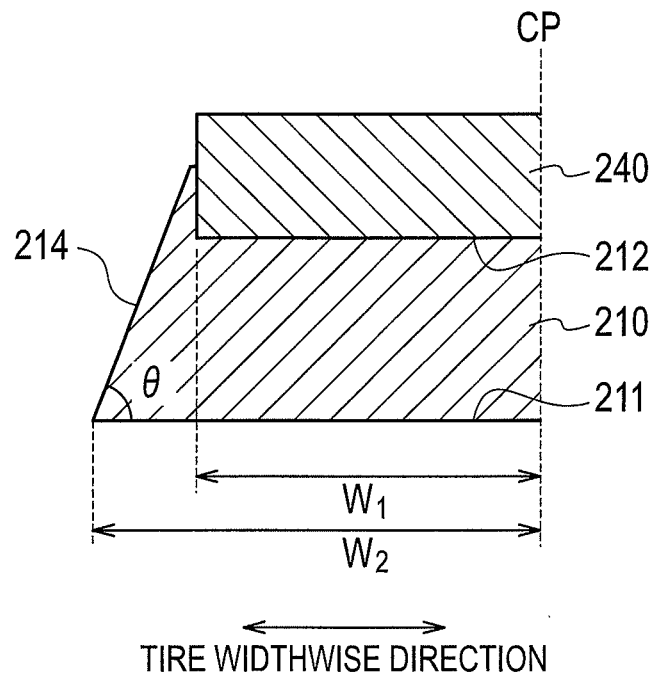
FIG. 24 is a diagram describing a relationship between an adhesive width of the pedestal 210 and an adhesive width of a function component 240.
Figure 25:
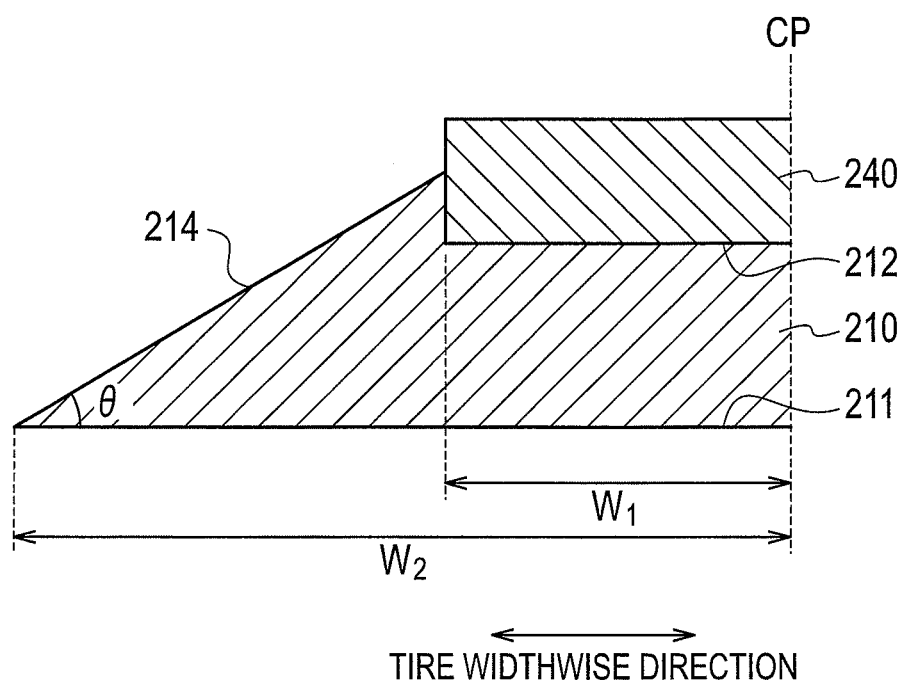
FIG. 25 is a diagram describing a relationship between an adhesive width of the pedestal 210 and an adhesive width of the function component 240.

In FIG. 24 and FIG. 25, when the pedestal 210 and the function component 240 are divided by a plane (hereinafter, referred to as "center plane CP") passing through the center of the pedestal 210 and the function component 240 in the tire widthwise direction, halves the pedestal 210 and the function component 240 are illustrated.

As shown in FIG. 24 and FIG. 25, the pedestal 210 has a pedestal inclined surface 214 that continues from the end of the pedestal lower surface 211 to the end of the pedestal upper surface 212. The pedestal inclined surface 214 is an inclined surface that continues from the end of the pedestal lower surface 211 to the end of the pedestal upper surface 212, in the tire widthwise direction.

In such a case, $W_1$ denotes an adhesive width from the end of the function component 240 bonded to the pedestal 210 (pedestal upper surface 212) to the center plane CP, in the tire widthwise direction. $W_2$ denotes an adhesive width from the end of the pedestal 210 (pedestal lower surface 211) bonded to the inner surface of the tire 100 to the center plane CP, in the tire widthwise direction.

In such a case, the $W_2$ preferably is equal to or more than 100% the $W_1$ and equal to or less than 150% the $W_1$.

The $W_2$ is equal to or more than 100% the $W_1$, and thus, the angle θ formed by the pedestal inclined surface 214 and the inner surface of the tire 100 is acute, as a result of which the stress is less likely to be concentrated on the end of the pedestal upper surface 212 in the tire widthwise direction.

On the other hand, as shown in FIG. 15, even when the adhesive width $W_{210}$ is large, the weight of the pedestal 210 increases while the stress remains unchanged at the end of the pedestal upper surface 212, and thus, it may suffice that the $W_2$ is equal to or less than 150% the $W_1$. Preferably, the $W_2$ preferably is about 120% the $W_1$.

It is noted that FIG. 24 illustrates a case where the $W_2$ is 105% the $W_1$, and FIG. 25 illustrates a case where the $W_2$ is 120% the $W_1$.

[Evaluation Result]

Hereinafter, an evaluation result will be described with reference to FIG. 26. Specifically, the pedestals 210 according to Example 1 and Example 2 were prepared. The pedestals 210 was bonded to the inner surface (inner liner) of the tire 100, and the tire 100 was pressed against a rotation drum after which the durability limit of the pedestal 210 was measured.

(Common Condition)

Tire size=195/65R15
Tire inner pressure=280 kPa
Load=650 kgf

Example 1

Adhesive length $L_{210}$ of pedestal 210=38 mm
Adhesive width $W_{210}$ of pedestal 210=47 mm
Thickness $T_{210}$ of pedestal 210=6 mm
Length $L_{240}$ of function component 240=26 mm
Width $W_{240}$ of function component 240=35 mm
Shape of pedestal inclined surface 213=flat shape Example 2

Adhesive length $L_{210}$ of pedestal 210=43 mm
Adhesive width $W_{210}$ of pedestal 210=42 mm
Thickness $T_{210}$ of pedestal 210=3 mm
Length $L_{240}$ of function component 240=26 mm
Width $W_{240}$ of function component 240=35 mm
Curvature radius R of pedestal inclined surface 213=10 mm As shown in FIG. 26, in the Example 2, even at a higher speed operation as compared to the Example 1, it is confirmed that the pedestal 210 is not damaged.

Second Embodiment

[Overview of Second Embodiment]

An attachment structure according to the present embodiment relates to a structure that attaches a function component having a function of detecting a state of a tire to an inner surface of the tire. The attachment structure includes a pedestal that is configured by an elastic member and that includes a pedestal lower surface bonded to the inner surface of the tire, a pedestal upper surface arranged opposite to the pedestal lower surface, and a pedestal inclined surface that continues from the end of the pedestal lower surface in the tire circumferential direction to the end of the pedestal upper surface in the tire circumferential direction. The pedestal inclined surface has a recessed portion recessed with a curvature of a curvature radius R toward the center of the pedestal in the tire circumferential direction. In the cross section along the tire circumferential direction, a denotes a point farthest from the inner surface of the tire, in the recessed portion; b denotes a point at which to contact with the inner surface of the tire, in the recessed portion; c denotes an intersection point that intersects with a perpendicular line that extends down from the a to the pedestal lower surface, in the pedestal lower surface; ac denotes a line segment that links the a and the c; bc denotes a line segment that links the b and the c; A denotes a shorter length, out of the ac and the bc; and B denotes a longer length, out of the ac and the bc. When the A and the B satisfy a condition of $\frac{1}{3}^{0.5} \times B < A < B$, the R satisfies a relationship of $(A^2+B^2)/(2 \times A) < R < (A^2+B^2)^{0.5}$.

In the present embodiment, the pedestal inclined surface has a recessed portion recessed toward the center of the pedestal in the tire circumferential direction, and thus, the detachment from the inner surface of the tire is restrained. Further, it is not necessary to use soft rubber, and thus, a decrease in durability of the pedestal can be suppressed.

Further, when the A and the B satisfy a condition of $\frac{1}{3}^{0.5} \times B < A < B$, the R satisfies a relationship of $(A^2+B^2)/(2 \times A) < R < (A^2+B^2)^{0.5}$. Therefore, it is possible to appropriately define the curvature radius R of the pedestal inclined surface.

It is noted that in the present embodiment, the same portion as that in the aforementioned first embodiment will be omitted, where necessary. Therefore, "(Configuration of tire)", "(Configuration of attachment structure)", "(Configuration of frame)", "(Dimension of frame)", "(Configuration of insertion piece)", "(assembly of attachment structure)", "(Wobbling)", and "(Deformation of inner liner)" are the same as those in the above-described embodiment, and thus, the description therefor will be omitted.

(Configuration of Pedestal)

Figure 27:
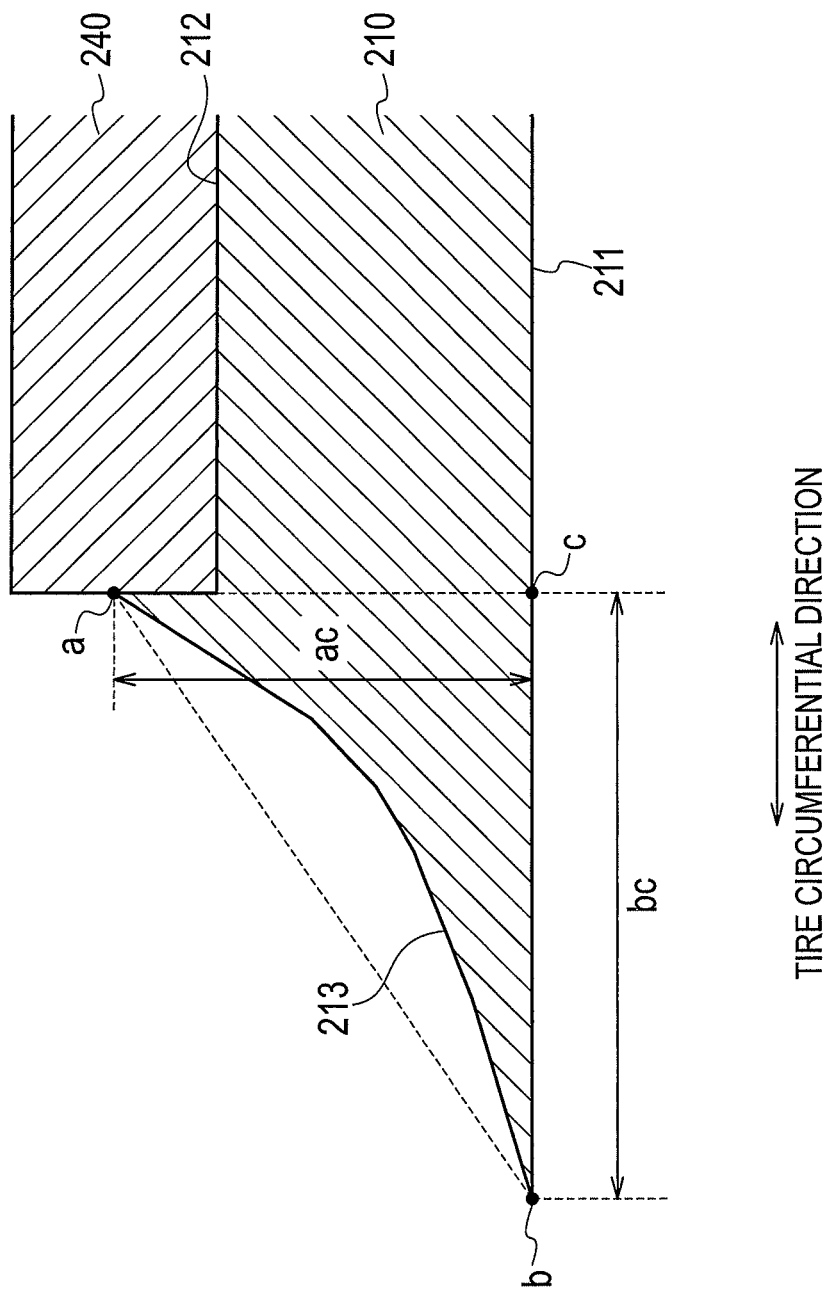
FIG. 27 is a diagram illustrating the pedestal 210 according to a second embodiment.

The configuration of the pedestal according to the second embodiment will be described, below. FIG. 27 is a diagram illustrating the pedestal 210 according to the second embodiment. It should be noted that in FIG. 27, the frame 220 and the base 230 are omitted.

As shown in FIG. 27, the pedestal 210 includes the pedestal lower surface 211 bonded to the inner surface of the tire 100, the pedestal upper surface 212 arranged opposite to the pedestal lower surface 211, and the pedestal inclined surface 213 that continues from the end of the pedestal lower surface 211 in the tire circumferential direction to the end of the pedestal upper surface 212 in the tire circumferential direction.

The pedestal inclined surface 213 has a recessed portion recessed with a curvature of a curvature radius R toward the center of the pedestal 210 in the tire circumferential direction. The recessed portion includes a portion that contacts the pedestal lower surface 211, in the pedestal inclined surface 213. In other words, the pedestal inclined surface 213 includes a recessed portion in a portion that contacts the pedestal lower surface 211.

It is noted that in the second embodiment, a case where the whole pedestal inclined surface 213 is configured by the recessed portion is illustrated.

Herein, in the cross section in the tire circumferential direction, the meaning of each abbreviation is as follows:

a denotes a point farthest from the inner surface of the tire 100, in the pedestal inclined surface 213 (recessed portion);

b denotes a point that contacts the inner surface of the tire 100, in the pedestal inclined surface 213 (recessed portion);

c denotes an intersection point that intersects with a perpendicular line that extends down to the pedestal lower surface 211 from the a, in the pedestal lower surface 211;

ab denotes a line segment that links a and b;

ac denotes a line segment that links a and c;

bc denotes a line segment that links b and c;

A denotes a shorter length, out of ac and bc; and

B denotes a longer length, out of ac and bc.

Herein, as described later, the smaller the curvature radius R of the recessed portion of the pedestal inclined surface 213, the more the shearing stress generated between the inner surface of the tire 100 and the pedestal lower surface 211 decreases. In particular, when the curvature radius R is smaller than $(A^2+B^2)^{0.5}$, the stress generated by the front-back input decreases Therefore, the maximum value of the curvature radius R preferably is $(A^2+B^2)^{0.5}$.

Figure 28:
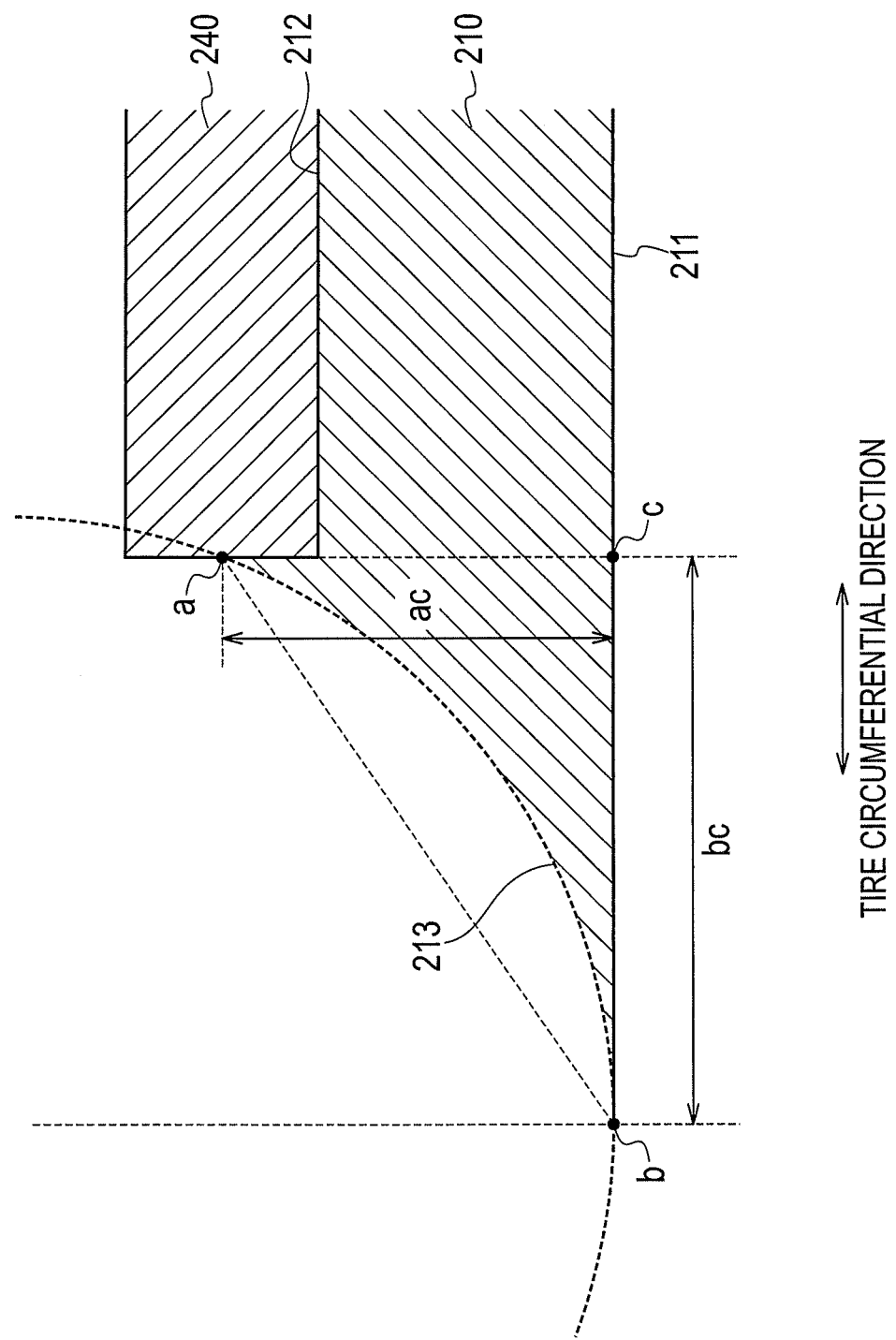
FIG. 28 is a diagram illustrating the pedestal 210 according to the second embodiment.

However, when $\frac{1}{3}^{0.5} \times B = A$, the relationship of $(A^2+B^2)/(2 \times A) = (A^2+B^2)^{0.5}$ is satisfied. In such a case, as shown in FIG. 28, a circle of curvature radius R is a circle that contacts a horizontal line that passes through b. In such a case, it is not possible to decrease the curvature radius R than a value of "$(A^2+B^2)/(2 \times A)$".

Therefore, it is necessary to consider two cases, that is, in case (1), a condition of $\frac{1}{3}^{0.5} \times B < A$ is satisfied, and in case (2), a condition of $A < \frac{1}{3}^{0.5} \times B$ is satisfied.

In the case (1), the relationship of $(A^2+B^2)/(2 \times A) < (A^2+B^2)^{0.5}$ is satisfied, and thus, the minimum value of the curvature radius R is $(A^2+B^2)/(2 \times A)$. Therefore, the curvature radius R satisfies the relationship of $(A^2+B^2)/(2 \times A) < R < (A^2+B^2)^{0.5}$.

In the case (2), the relationship of $(A^2+B^2)^{0.5} < (A^2+B^2)/(2 \times A)$ is satisfied, and thus, the minimum value of the curvature radius R is $(A^2+B^2)/(2 \times A)$. Therefore, the curvature radius R satisfies the relationship of $(A^2+B^2)/(2 \times A)$ (Operation and Effect)

In the second embodiment, the pedestal inclined surface 213 has a recessed portion recessed toward the center of the pedestal 210 in the tire circumferential direction, and thus, the detachment from the inner surface of the tire 100 is restrained. Further, there is no need of utilizing soft rubber, and thus, a decrease in durability of the pedestal 210 is restrained.

Further, in the case (1) in which a condition of $\frac{1}{3}^{0.5} \times B < A < B$ is satisfied, the curvature radius R satisfies a relationship of $(A^2+B^2)/(2 \times A) < R < (A^2+B^2)^{0.5}$. Therefore, it is possible to appropriately define the curvature radius R of the recessed portion of the pedestal inclined surface.

Similarly, in the case (2) in which a condition of $A < \frac{1}{3}^{0.5} \times B$ is satisfied, the curvature radius R satisfies a relationship of $(A^2+B^2)/(2 \times A) < R$. Therefore, it is possible to appropriately define the curvature radius R of the recessed portion of the pedestal inclined surface.

[First Modification]

Hereafter, a first modification of the second embodiment is explained. Hereinafter, a difference from the second embodiment will be mainly described.

Figure 29:
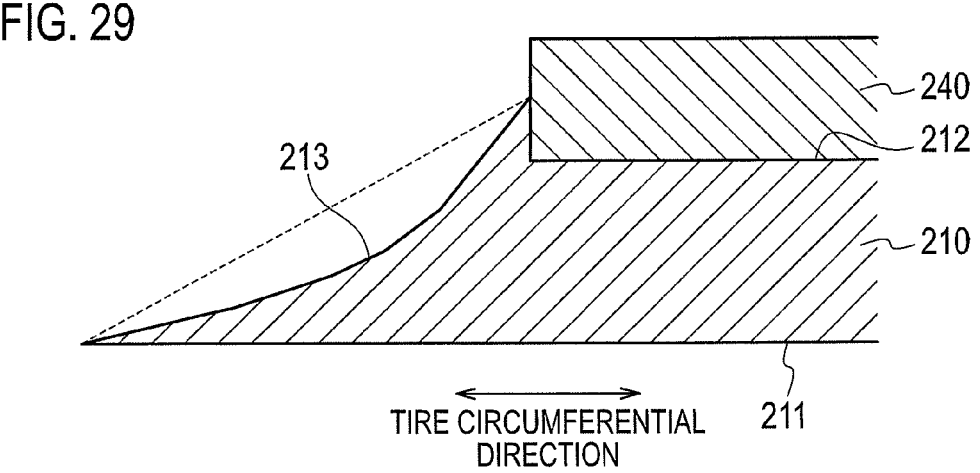
FIG. 29 is a diagram illustrating the pedestal 210 according to a first modification.
Figure 30:
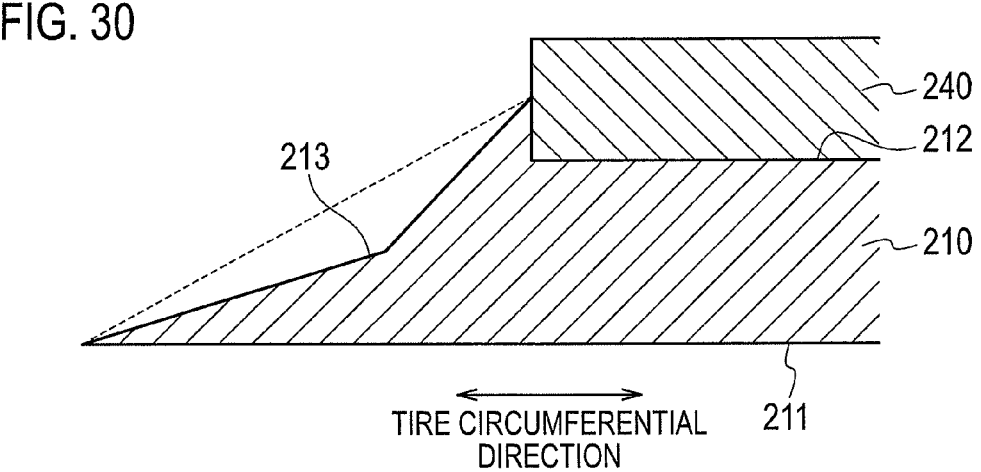
FIG. 30 is a diagram illustrating the pedestal 210 according to the first modification.

In the first modification, a variation of the shape of the pedestal inclined surface 213 will be described. Specifically, as shown in FIG. 29, the whole pedestal inclined surface 213 may be configured by a curvature of the curvature radius R. Alternately, as shown in FIG. 30, the pedestal inclined surface 213 is configured by a plurality of straight lines, and may approximately configure a curved line of the curvature radius R. Alternately, as shown in FIG. 31, the pedestal inclined surface 213 may be configured by a plurality of curved lines each having a different curvature radius.

Figure 31:
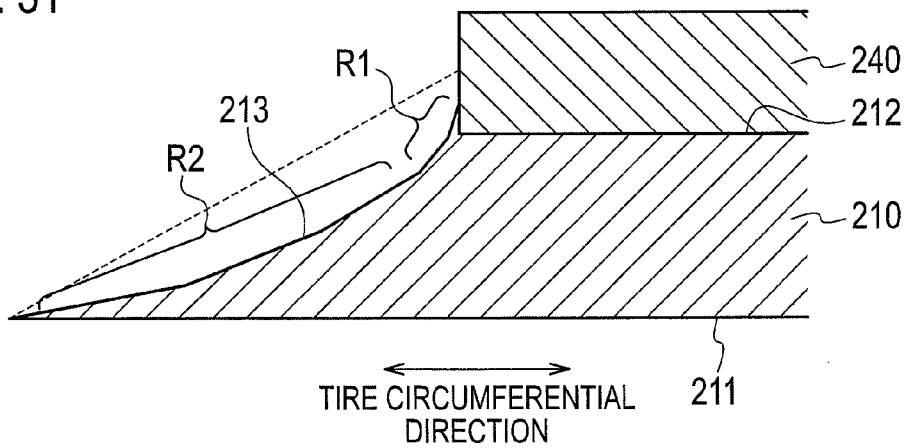
FIG. 31 is a diagram illustrating the pedestal 210 according to the first modification.

It should be noted that in a case illustrated in FIG. 31, the recessed portion having a curvature of the curvature radius R is a region including a portion that contacts with the pedestal lower surface 211, in the pedestal inclined surface 213.

[Curvature Radius of Recessed Portion]

Figure 32:
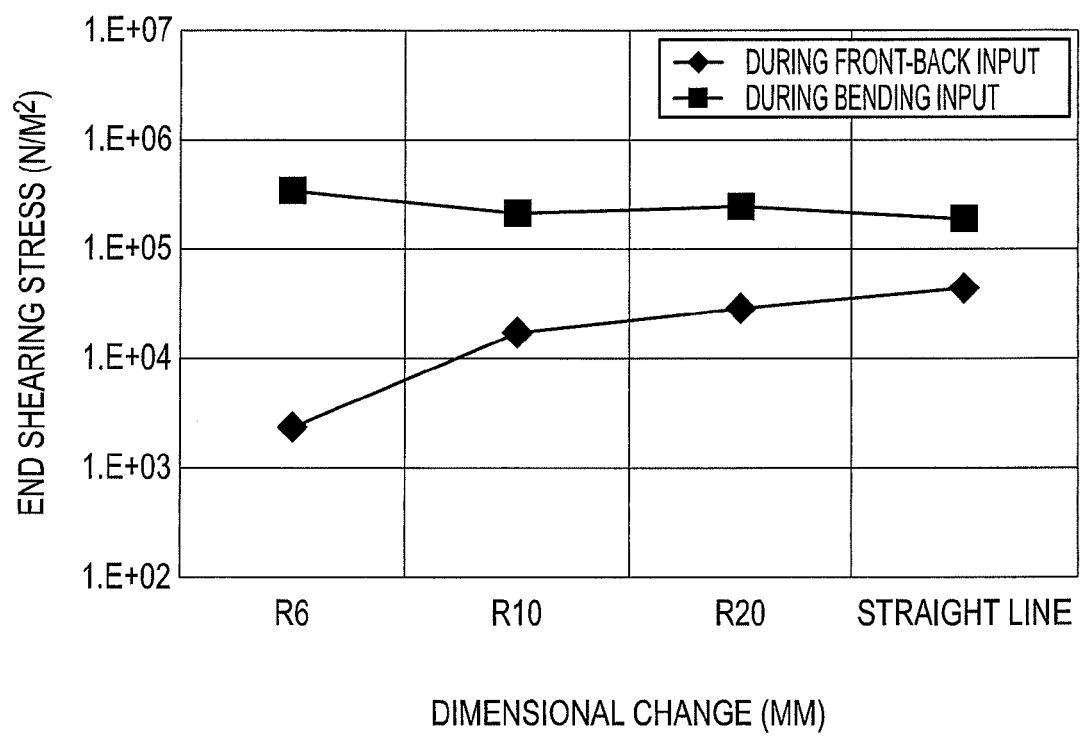
FIG. 32 is a diagram describing a relationship between a curvature radius of the pedestal inclined surface 213 and a shearing stress.

Hereinafter, the curvature radius of the recessed portion will be described with reference to FIG. 32. As shown in FIG. 32, the smaller the curvature radius R of the recessed portion of the pedestal inclined surface 213, the more the shearing stress generated between the inner surface of the tire 100 and the pedestal lower surface 211 decreases.

It is noted that in the measurement illustrated in FIG. 32, the dimension of each member is as follows:
 Adhesive length of pedestal 210=41 mm
 Adhesive width of pedestal 210=35 mm
 Thickness of pedestal 210=6 mm
 Attachment length of function component 240=26 mm
 Attachment width of function component 240=35 mm
 bc=8.5 mm(B)
 ac=6.0 mm(A)
 ab=$(A^2+B^2)^{0.5}$=10.4 mm As shown in FIG. 32, when the curvature radius R of the recessed portion of the pedestal inclined surface 213 is equal to or less than 10 mm, the stress generated by front-back input decreases. Therefore, the curvature radius R preferably is smaller than $(A^2+B^2)^{0.5}$.

[Evaluation Result 1]

Hereinafter, an evaluation result 1 will be described with reference to FIG. 33. Specifically, Example 3, and Comparative Examples 1 to 3 were prepared. In particular, the curvature radius R of the recessed portion of the pedestal inclined surface 213 was changed, and the stress generated by the front and back input (at the time of the front and back input) and the stress generated by the bending input (at the time of bending input) were calculated.

Herein, as the stress generated by the front-back input, 300 N, that is, the inertia force f exerted on the function component 240 (the center of gravity X) was added, and then, the stress generated at the end of the pedestal 210 (pedestal lower surface 211) in the tire circumferential direction was measured. As the stress generated by the bending input, the pedestal lower surface 211 was artificially deformed so that the curvature radius R of the pedestal lower surface 211 (the inner surface of the tire 100) was 300 mm in the tire circumferential direction, and the stress generated at the end of the pedestal 210 (the pedestal lower surface 211) in the tire circumferential direction was calculated.

Figure 33:
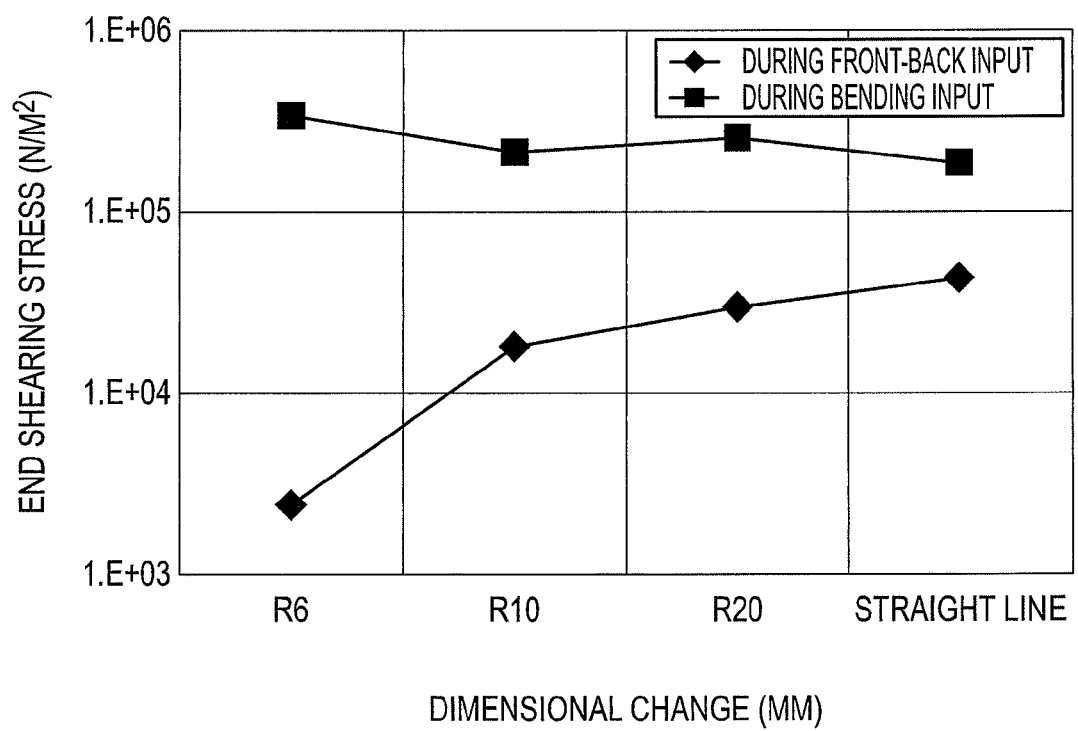
FIG. 33 is a diagram describing an evaluation result.

(Common Condition)
 Adhesive length of pedestal 210=41 mm
 Adhesive width of pedestal 210=35 mm
 Thickness of pedestal 210=3 mm
 Attachment length of function component 240=26 mm
 Attachment width of function component 240=35 mm
 Young's modulus of elastic member configuring the pedestal 210=7 MPa
 bc=8.5 mm(B)
 ac=6.0 mm(A)
 ab=$(A^2+B^2)^{0.5}$=10.4 mm As shown in FIG. 33, the smaller the curvature radius R, the smaller the stress generated by front-back input becomes. On the other hand, the smaller the curvature radius R, the more the stress generated by the bending input increases. Therefore, when a balance between the stress generated by the front-back input and the stress generated by the bending input is considered, it is confirmed that the optimal value of the curvature radius R is $(A^2+B^2)^{0.5}$=10.4 mm.

It is noted that it is confirmed that the smaller the curvature radius R, the smaller the stress generated by the front-back input, and thus, the curvature radius R preferably is smaller than $(A^2+B^2)^{0.5}$.

[Evaluation Result 2]

Hereinafter, an evaluation result 2 will be described with reference to FIG. 34. Specifically, Example 4 and Comparative Examples 4 to 6 were prepared. In particular, similarly to the evaluation result 1, the curvature radius R of the recessed portion of the pedestal inclined surface 213 was changed, and the stress generated by the front and back input (at the time of the front and back input) and the stress generated by the bending input (at the time of bending input) were measured.

Figure 34:
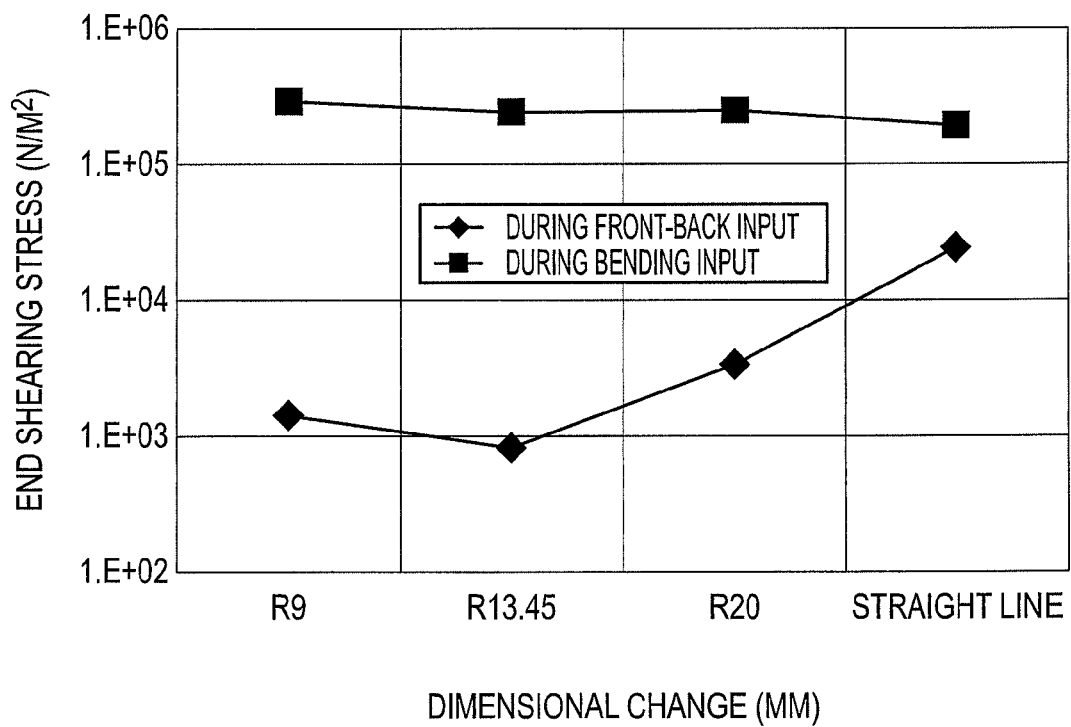
FIG. 34 is a diagram describing an evaluation result.

(Common Condition)
 Adhesive length of pedestal 210=41 mm
 Adhesive width of pedestal 210=35 mm
 Thickness of pedestal 210=6 mm
 Attachment length of function component 240=21 mm
 Attachment width of function component 240=35 mm
 Young's modulus of elastic member configuring the pedestal 210=7 MPa
 bc=10 mm(B)
 ac=9 mm(A)
 ab=$(A^2+B^2)^{0.5}$=13.45 mm As shown in FIG. 34, the smaller the curvature radius R, the smaller the stress generated by front-back input. On the other hand, the smaller the curvature radius R, the more the stress generated by the bending input increases. Therefore, when a balance between the stress generated by the front-back input and the stress generated by the bending input is considered, it is confirmed that the optimal value of the curvature radius R is $(A^2+B^2)^{0.5}$=13.45 mm.

It is noted that it is confirmed that the smaller the curvature radius R, the smaller the stress generated by the front-back input, and thus, the curvature radius R preferably is smaller than $(A^2+B^2)^{0.5}$.

Other Embodiments

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

In the embodiments, a case where the attachment structure 200 includes the frame 220, the base 230, and the insertion piece 250 is illustrated; however, the embodiments are not limited thereto. The attachment structure 200 may not include the frame 220, the base 230, and the insertion piece 250. That is, the attachment structure 200 may be configured only by the pedestal 210.

In the embodiments, as a dimensional expression, a term of "equal to" was used; naturally, it is possible to accept a dimensional error.

It should be noted that the "predetermined rigidity" used in the embodiments is at least larger than the rigidity of a member (elastic member) configuring the pedestal.

In the embodiments, the shape of the frame upper surface of the frame 220 is rectangular. However, the embodiments are not limited thereto. Specifically, the shape of the frame upper surface of the frame 220 may be triangular or another shape.

Although not particularly stated in the above-described first embodiment, the length $L_{240}$ of the function component 240 preferably is 60% the adhesive length $L_{210}$ of the pedestal 210. Specifically, it should be noted that as shown in FIG. 15, the smaller the length $L_{240}$ of the function component 240, the smaller the stress generated by the bending input.

Although not particularly stated in the above-described first embodiment, the width $W_{240}$ of the function component 240 preferably is about 35 mm. Specifically, as shown in FIG. 15, the larger the width $W_{240}$ of the function component 240, the smaller the stress generated by the front-back input. Further, it should be noted that if the width $W_{240}$ of the function component 240 is too large, then when the tire 100 comes into contact with the road surface, the adhesive surface between the pedestal 210 (pedestal upper surface 212) and the function component 240 cannot follow a change in curvature radius of the inner surface of the tire 100, in the cross section in the tire widthwise direction.

In the above-described first embodiment, the adhesive length $L_{210}$ may be the maximum adhesive length when the pedestal lower surface 211 is bonded to the inner surface of the tire 100, in the tire circumferential direction, and may also be an average adhesive length obtained at that time. Similarly, the adhesive width $W_{210}$ may be the maximum adhesive width or an average adhesive width in the tire widthwise direction where the pedestal lower surface 211 is bonded to the inner surface of the tire 100.

In addition, the entire content of Japanese Patent Application No. 2011-126441 (filed on Jun. 6, 2011) and Japanese Patent Application No. 2011-126554 (filed on Jun. 6, 2011) is incorporated in the present specification by reference.

INDUSTRIAL APPLICABILITY

According to the present invention, it is possible to provide an attachment structure that enables restraining of detachment from an inner surface of a tire while restraining a decrease in durability.

The invention claimed is:

1. An attachment structure that attaches a function component having a function of detecting a state of a tire to an inner surface of the tire, comprising:
    a pedestal formed of an elastic member, and including a pedestal lower surface bonded to the inner surface of the tire and a pedestal upper surface arranged opposite to the pedestal lower surface, wherein
    an adhesive length in a tire circumferential direction where the pedestal lower surface is bonded to the inner surface of the tire is equal to or less than 45 mm, when the pedestal is bonded to the inner surface of the tire, wherein
    $M_{240}$ denotes a mass of the function component;
    $H_{240}$ denotes a height of center of gravity of the function component in a vertical direction relative to the inner surface of the tire;
    $T_{210}$ denotes a thickness of the pedestal in the vertical direction;
    R denotes a radius of the tire;
    $L_{210}$ denotes the adhesive length;
    V denotes a target durability speed;
    τmax denotes a maximum shearing stress generated at an end of the pedestal lower surface;
    A, B, and C denote coefficients;
    $D_{130}$ denotes a depth from the inner surface of the tire to a reinforcement layer arranged to the tire in the vertical direction; and
    $L_{210}$ is equal to or more than a value that satisfies a relationship of $\tau max/(A \times C) = (H_{240} + T_{210} + D_{130}) \times V^2/R \times M_{240} \times EXP(-B \times L_{210})$.

2. The attachment structure according to claim 1, wherein
    $M_{240}$ denotes a mass of the function component;
    $H_{240}$ denotes a height of center of gravity of the function component in a vertical direction relative to the inner surface of the tire;
    $T_{210}$ denotes a thickness of the pedestal in the vertical direction;
    R denotes a radius of the tire;
    $L_{210}$ denotes the adhesive length;
    V denotes a target durability speed;
    τmax denotes a maximum shearing stress generated at an end of the pedestal lower surface;
    A, B, and C denote coefficients;
    $D_{130}$ denotes a depth from the inner surface of the tire to a reinforcement layer arranged to the tire in the vertical direction; and
    $T_{210}$ is equal to or less than a value that satisfies a relationship of $\tau max/(A \times C) = (H_{240} + T_{210} + D_{130}) \times V^2/R \times M_{240} \times EXP(-B \times L_{210})$.

3. The attachment structure according to claim 1, wherein a thickness of the pedestal is larger than 1 mm in a vertical direction relative to the pedestal lower surface.

4. The attachment structure according to claim 1, wherein the pedestal includes a pedestal inclined surface that continues from an end of the pedestal lower surface in the tire circumferential direction to an end of the pedestal upper surface in the tire circumferential direction, and
    the pedestal inclined surface includes a shape recessed toward a center of the pedestal.

5. An attachment structure that attaches a function component having a function of detecting a state of a tire to an inner surface of the tire, comprising:
    a pedestal formed of an elastic member and including a pedestal lower surface bonded to an inner surface of the tire, a pedestal upper surface arranged opposite to the pedestal lower surface, and a pedestal inclined surface that continues from an end of the pedestal lower surface in a tire circumferential direction to an end of the pedestal upper surface in the tire circumferential direction, wherein
    the pedestal inclined surface has a recessed portion recessed with a curvature of a curvature radius R toward a center of the pedestal in the tire circumferential direction,
    in a cross section along the tire circumferential direction,
    a denotes a point farthest from an inner surface of the tire, in the recessed portion;
    b denotes a point at which to contact with the inner surface of the tire, in the recessed portion;
    c denotes an intersection point that intersects with a line that extends down from the a to the pedestal lower surface and is perpendicular with the pedestal lower surface, in the pedestal lower surface;
    ac denotes a line segment that links the a and the c;
    bc denotes a line segment that links the b and the c;
    A denotes a shorter length, out of the ac and the bc; and
    B denotes a longer length, out of the ac and the bc, and
    when the A and the B satisfy a condition of $\frac{1}{3}^{0.5} \times B < A < B$, the R satisfies a relationship of $(A^2 + B^2)/(2 \times A) < R < (A^2 + B^2)^{0.5}$, wherein
    $M_{240}$ denotes a mass of the function component;
    $H_{240}$ denotes a height of center of gravity of the function component in a vertical direction relative to the inner surface of the tire;
    $T_{210}$ denotes a thickness of the pedestal in the vertical direction;
    R denotes a radius of the tire;

$L_{210}$ denotes the adhesive length;

V denotes a target durability speed;

τmax denotes a maximum shearing stress generated at an end of the pedestal lower surface;

A, B, and C denote coefficients;

$D_{130}$ denotes a depth from the inner surface of the tire to a reinforcement layer arranged to the tire in the vertical direction; and $L_{210}$ is equal to or more than a value that satisfies a relationship of $\tau max/(A \times C) = (H_{240} + T_{210} + D_{130}) \times V^2/R \times M_{240} \times EXP(-B \times L_{210})$.

6. The attachment structure according to claim 5, wherein the recessed portion includes a portion that contacts the pedestal lower surface, in the pedestal inclined surface.

7. The attachment structure according to claim 5, wherein in a cross section along the tire circumferential direction, when the A and the B satisfy a condition of $A < \frac{1}{3}^{0.5} \times B$, the R satisfies a relationship of $(A^2 + B^2)/(2 \times A) < R$.

8. An attachment structure that attaches a function component having a function of detecting a state of a tire to an inner surface of the tire, comprising:

a pedestal formed of an elastic member and including a pedestal lower surface bonded to an inner surface of the tire, a pedestal upper surface arranged opposite to the pedestal lower surface, and a pedestal inclined surface that continues from an end of the pedestal lower surface in a tire circumferential direction to an end of the pedestal upper surface in the tire circumferential direction, wherein the pedestal inclined surface has a recessed portion recessed with a curvature of a curvature radius R toward a center of the pedestal in the tire circumferential direction, in a cross section along the tire circumferential direction, a denotes a point farthest from an inner surface of the tire, in the recessed portion;

b denotes a point at which to contact with the inner surface of the tire, in the recessed portion;

c denotes an intersection point that intersects with a line that extends down from the a to the pedestal lower surface and is perpendicular with the pedestal lower surface, in the pedestal lower surface;

ac denotes a line segment that links the a and the c;

bc denotes a line segment that links the b and the c;

A denotes a shorter length, out of the ac and the bc; and

B denotes a longer length, out of the ac and the bc, and when the A and the B satisfy a condition of $\frac{1}{3}^{0.5} \times B < A < B$, the R satisfies a relationship of $(A^2+B^2)/(2 \times A) < R < (A^2+B^2)^{0.5}$.

9. The attachment structure according to claim 8, wherein the recessed portion includes a portion that contacts the pedestal lower surface, in the pedestal inclined surface.

10. The attachment structure according to claim 8, wherein in a cross section along the tire circumferential direction, when the A and the B satisfy a condition of $A < \frac{1}{3}^{0.5} \times B$, the R satisfies a relationship of $(A^2+B^2)/(2 \times A) < R$.

\* \* \* \* \*